(12) United States Patent
Belanger et al.

(10) Patent No.: US 7,985,847 B2
(45) Date of Patent: Jul. 26, 2011

(54) RECOVERY OF LIGNIN AND WATER SOLUBLE SUGARS FROM PLANT MATERIALS

(75) Inventors: Helene Belanger, Auckland (NZ); Ross L. Prestidge, Auckland (NZ); Tony James Lough, Auckland (NZ); James D. Watson, Auckland (NZ); Clare Elton, Auckland (NZ)

(73) Assignee: BioJoule Ltd., Auckland (NZ)

( * ) Notice: Subject to any disclaimer, the term of this patent is extended or adjusted under 35 U.S.C. 154(b) by 0 days.

(21) Appl. No.: 12/638,862

(22) Filed: Dec. 15, 2009

(65) Prior Publication Data

US 2010/0136642 A1 Jun. 3, 2010

Related U.S. Application Data

(63) Continuation of application No. 11/745,993, filed on May 8, 2007, now Pat. No. 7,649,086.

(60) Provisional application No. 60/746,682, filed on May 8, 2006, provisional application No. 60/869,057, filed on Dec. 7, 2006.

(51) Int. Cl.
*C08L 97/02* (2006.01)
(52) U.S. Cl. ...................................... 530/502
(58) Field of Classification Search ................... 530/502
See application file for complete search history.

(56) References Cited

U.S. PATENT DOCUMENTS

| | | | |
|---|---|---|---|
| 3,585,104 A | 6/1971 | Kleinert | |
| 4,100,016 A | 7/1978 | Diebold et al. | |
| 4,100,106 A | 7/1978 | Stefani et al. | |
| 4,409,032 A | 10/1983 | Paszner et al. | |
| 4,470,851 A | 9/1984 | Paszner et al. | |
| 4,764,596 A | 8/1988 | Lora et al. | |
| 5,196,460 A | 3/1993 | Lora et al. | |
| 5,372,939 A | 12/1994 | Lastick et al. | |
| 5,680,995 A | 10/1997 | Salminen | |
| 5,681,427 A | 10/1997 | Lora et al. | |
| 5,705,216 A | 1/1998 | Tyson | |
| 5,788,812 A | 8/1998 | Agar et al. | |
| 5,865,948 A | 2/1999 | Lora et al. | |
| 5,879,463 A | 3/1999 | Proenca | |
| 6,409,841 B1 * | 6/2002 | Lombard | 127/37 |
| 6,660,506 B2 | 12/2003 | Nguyen et al. | |
| 6,763,947 B1 | 7/2004 | Brooks | |
| 7,109,005 B2 | 9/2006 | Eroma et al. | |
| 7,189,306 B2 | 3/2007 | Gervais | |
| 7,465,791 B1 | 12/2008 | Hallberg et al. | |
| 2002/0069987 A1 | 6/2002 | Pye | |
| 2008/0029233 A1 | 2/2008 | Wingerson et al. | |
| 2008/0032344 A1 | 2/2008 | Fallavollita | |
| 2008/0295980 A1 | 12/2008 | Hallberg et al. | |
| 2008/0299628 A1 | 12/2008 | Hallberg et al. | |

FOREIGN PATENT DOCUMENTS

| | | |
|---|---|---|
| AU | 200051888 B2 | 2/2001 |
| WO | 84/03304 A1 | 8/1984 |
| WO | 92/13849 | 8/1992 |
| WO | 96/41052 A1 | 12/1996 |
| WO | 0210073 A1 | 2/2002 |
| WO | 2007/051269 A1 | 5/2007 |
| WO | 2007/129221 A2 | 11/2007 |
| WO | 2008/144878 A1 | 12/2008 |
| WO | 2008/144903 A1 | 12/2008 |
| WO | 2009/003292 A1 | 1/2009 |

OTHER PUBLICATIONS

Blokhina, Olga et al., Antioxidants, Oxidative Damage and Oxygen Deprivation Stress: a Review; Annals of Botany, vol. 91, pp. 179-194 (2003), Helsinki University, Finland.
Aldrich Handbook of Fine Chemicals and Laboratory Equipment, (Sigma-Aldrich), pp. 1124-1125; (2003-2004) Australia-New Zealand.
PCT/NZ2007/000106 International Search Report; Australian Patent Office, 6 pages; (Sep. 9, 2007).
PCT/NZ2007/000106 Written Opinion; Australian Patent Office, 6 pages; (Sep. 9, 2007).
Balakshin, Mikhail Yu, et al., "Elucidation of the Structures of Residual and Dissolved Pine Kraft Lignins Using an HMQC NMR Technique," J. Agric. Food Chem., vol. 51, pp. 6166-6127 (2003).
Berlin, Alex et al., "Inhibition of Cellulase, Xylanase and B-glucosidase Activities by Softwood Lignin Preparations," Journal of Biotechnology, vol. 125, pp. 198-209 (2006).
Capanema, Ewellyn A. et al., "Quantitative Characterization of a Hardwood Milled Wood Lignin by Nuclear Magnetic Resonance Spectroscopy," J. Agric. Food Chem., vol. 53, pp. 9639-9649 (2005).
Capanema, Ewellyn A. et al., "Structural Analysis of Residual and Technical Lignins by 1H-13C Correlation 2D NMR-Spectroscopy," Holzforschung vol. 55, pp. 302-308 (2001).
Heindel, T.J. et al., "IPST Technical Paper Series No. 857," Institute of Paper Science and Technology, Atlanta Georgia (May 2000).

(Continued)

*Primary Examiner* — David W Wu
*Assistant Examiner* — Sonya Wright
(74) *Attorney, Agent, or Firm* — Ann W. Speckman; Janet Sleath; Speckman Law Group PLLC

(57) ABSTRACT

In one aspect, a process for treating woody plant material is provided, the process involving contacting the plant material with a continuous flow of an aqueous ethanol solution at elevated temperature and pressure under conditions that promote extraction of ethanol-soluble lignin from the plant material and retention of hemicellulose sugars, xylose and cellulose in the treated plant material solids. In another aspect, a process for extracting hemicellulose sugars from lignin-depleted plant material solids is provided, the process involving contacting lignin-depleted plant material with water at elevated temperature and pressure under conditions that promote extraction of hemicellulose sugars from the plant material; and recovering hemicellulose sugars from the liquid mixture.

13 Claims, 11 Drawing Sheets

OTHER PUBLICATIONS

Aristidou, Aritos, et al., "Metabolic engineering applications to renewable resource utilization," Current Opinions Biotechnology, vol. 11, pp. 187-198 (2000).

Bakker, R.R., et al., "Biofuel production from acid-impregnated willow and switchgrass," 2nd World Conference on Biomass for Energy Industry and Climate Protection, pp. 1467-1470, Rome Italy (May 10-14, 2004).

Boussaid, Abdel, et al., "Fermentability of the Hemicellulose-Derived Sugars from Steam-Exploded Softwood (Douglas Fir)," Biotechnology and Bioengineering, vol. 64, No. 3, pp. 284-289 (Aug. 5, 1998).

Brownell, Harold H. et al., "Steam pre-treatment of lignocellulosic material for enhanced enzymatic hydrolyssis" Biotechnology and Bioengineering, vol. 29, pp. 228-235 (Feb. 1987).

Chum, H.L. et al., "Organosolv Pretreatment for Enzymatic Hydrolysis of Poplars: I Enzyme Hydrolysis of Cellulosic Residues," Biotechnology and Bioengineering, vol. 31, pp. 643-649 (May 1988).

Funaoka, M. et al., "Conversion of Native Lignin to a Highly Phenolic Functional Polymer and Its Separation From Lignocellulosics," Biotechnology and Bioengineering, vol. 46, No. 6, pp. 545-552 (Jun. 20, 1995).

Garrote, G. et al., "Non-isothermal autohydrolysis of Eucalyptus wood," Wood Scient and Technology, vol. 36, pp. 111-123 (2002).

Holtzapple, Mark T. et al., "The effect of ogranosolv pretreatment on the enzymatic hydrolysis of poplar," Biotechnology and Bioengineering, vol. 26, pp. 670-676 (Jul. 1984).

Kim, S. et al., "Effect of structural features on enzyme digestibility of corn stover," Bioresource Technololgy, vol. 97(4) pp. 583-591 (2006).

Kim, Tai Hyun et al., "Fractionation of corn stover by hot-water and aqueos ammonia treatment," Bioresource Technology vol. 97, pp. 224-232 (2006).

Klinke, H.B. et al., "Inhibition of ethanol-producing yeast and bacteria by degradation products produced during pre-treatment of biomass." Appl. Microbiol. Biotechnol. vol. 66, pp. 10-26 (2004).

Kubo, Satoshi et al., "Poly (Ethylene Oxide)/Organosolv Lignin Blends: Relationship between Thermal Properties, Chemical Structure, and Blend Behavior," Macromolecules vol. 37, No. 18, pp. 6904-6911 (Jul. 31, 2004).

Lin, Yan et al., "Ethanol fermentation from biomass resources: current state and prospects," Appl. Microbiol. Biotechnol. vol. 69, pp. 627-642 (2006).

Liu, Chaogang et al., "Partial flow of compressed-hot water through corn stover to enhance hemicellulose sugar recovery and enzymatic digestibility of cellulose," Bioresource Technololgy, vol. 96, pp. 1978-1985 (Feb. 2006).

Lora, Jairo H. et al., "Recent Industrial Applications of Lignin: A Sustainable Alternative to Nonrenewable Materials." Journal of Polymers and the Environment, vol. 10, Nos. 1-2, pp. 39-47 (Apr. 2002).

Mosier, Nathan et al., "Features of promising technologies for pretreatment of lignocellulosic biomass," Bioresource Technology, vol. 96, pp. 673-686 (2005).

Nagle, Nicholas J. et al., "Efficacy of a hot washing process for pretreated yellow poplar to enhance bioethanol production," Biotechnol. Prog., vol. 18, No. 4, pp. 734-738 (May 6, 2002).

Pan, Xuejun et al., "Biorefining of softwoods using ethanol organosolv pulping: preliminary evaluation of process streams for manufacture of fuel-grade ethanol andco-products," Biotechnology and Bioengineering, vol. 90, No. 4, pp. 473-481 (May 20, 2005).

Rughani, Jagdish et al., "Combined Rapid-Steam Hydrolysis and Organosolv Pretreatment of Mixed Southern Hardwoods," Biotechnolology and Bioengineering, vol. 33, pp. 681-686 (Feb. 1989).

Wyman, Charles E. et al., "Comparative sugar recovery data from laboratory scale application of leading pretreatment technologies to corn stover," Bioresource and Technology, vol. 96, pp. 2026-2032 (Feb. 25, 2005).

Wyman Charles E. et al., "Coordinated development of leading biomass pretreatment technologies," Bioresource and Technology, vol. 96, pp. 1959-1966 (Feb. 26, 2005).

Yang, Bin et al., "Effect of Xylan and Lignin Removal by Batch and Flowthrough Pretreatment on the Enzymatic Digestibility of Corn Stover Cellulos,." Bioresource and Technology, vol. 86, No. 1, pp. 88-95 (Apr. 15, 2004).

Peng, Claudio A.,"Biorefining: Back to the Future," Innovation vol. 6, No. 4, pp. 12-15 (Mar. 2002).

McFarlane, Al et al., "Pretreatment of Willow Using Ethanol Solutions for Lignin Extraction," Department of Chemicals and Materials Engineering, School of Engineering, University of Auckland and AgriGenesis Biosciences Limited, Auckland, New Zealand, 7 pages, 2005.

McFarlane, Al L. et al., "Ethanol-water pulping: Estimation of activation energy using recycle reactor," Department of Chemicals and Materials Engineering, School of Engineering, University of Auckland, Auckland, New Zealand, 17 pages, 2008.

UNEP Working Group on Cleaner Production in Pulp and Paper Industries, The ALCELL Process for Eliminating Sulfur from Pulping: Manufacture of Paper and Paper Products #16, Case Study,Technical Research Center of Finland, SF-02051 Espoo, Finland, http://www.p2pays.org/ref/10/09315.htm (1992).

Li, Jiebing et al., "Carbohydrate reactions during high-temperature steam treatment of aspen wood," Applied Biochemistry and Biotechnology, vol. 125, pp. 175-188 (Feb. 4, 2005).

Sassner, Per et al., "Steam pretreatment of Salix with and without SO2 impregnation for production of bioethanol," Applied Biochemistry and Biotechnology, vol. 121-124, pp. 1101-1117 (2005).

* cited by examiner

RECOVERY OF LIGNIN AND WATER SOLUBLE SUGARS FROM PLANT MATERIALS

REFERENCE TO RELATED APPLICATIONS

This application is a continuation of U.S. patent application Ser. No. 11/745,993 filed May 8, 2007, which claims priority to U.S. Provisional Patent Application No. 60/746,682 filed May 8, 2006 and U.S. Provisional Patent Application No. 60/869,057 filed Dec. 7, 2006.

FIELD OF THE INVENTION

The present invention provides methods and apparatus for the production of biofuel from plant materials. More specifically, the present invention provides an integrated process for the production of plant biomass such as *Salix* spp. and its conversion to ethanol and other valuable products.

BACKGROUND

Woody biomass can be employed as a sustainable source of energy and is a valuable alternative to fossil fuels. More specifically, the biorefining of lignocellulosic material into fuel ethanol and lignin materials has the potential to displace a portion of petrol and oil based materials. It is likely that, with the depletion of global oil reserves and increasing awareness of the environmental and national security issues associated with dependence on fossil fuel, biomass will become a key resource for the production of transport fuel in much of the world.

The conversion of lignocellulosic biomass into fuel ethanol may offer the ideal solution given the rapid growth of short rotation crops such as shrub willow (*Salix* spp.).

Two of the main components of wood, cellulose and hemicellulose, are polymers of simple sugars that can be converted into ethanol and/or other chemicals by fermentation. This ethanol can be used as a transportation fuel either on its own or as an ethanol-gasoline blend. Ethanol-gasoline blends of up to 10% ethanol can be used without any engine modification or loss in engine performance (Hunt, V. D. (1981) The Gasohol Handbook, New York, Industrial Press). Lignin, the third main component of wood, is a potential raw material for the production of plastics, adhesives and resins (Lora and Glasser (2002) *J. Polymers Environ.* 10:39-47). The use of lignin in high value products, rather than as boiler fuel, will off-set the high costs traditionally associated with the processing of wood and production of ethanol.

Willow biomass plantations can be easily and efficiently established from dormant stem cuttings using mechanical systems. Shrub willows respond to coppicing after the first growing season by prolific production of new stem growth in the second growing season. Above ground woody biomass is harvested during the dormant season. During the spring following each harvest, the remaining portion of the willow plant, known as the stool, responds by producing numerous new stems, initiating a new cycle of growth that can be harvested in another two to four years. This cycle can be repeated for six to eight harvests before the stools need to be replaced.

Lignocellulose is a complex substrate composed of a mixture of carbohydrate polymers (namely cellulose and hemicellulose) and lignin. The conversion of lignocellulosic biomass into ethanol relies mainly on the efficient separation of these cell wall components to allow the hydrolysis of the carbohydrates polymer into fermentable sugars. Most of the processes using high temperature or pressure with acid, caustic or organic solvent are able to provide a cellulose substrate that can be chemically or enzymatically converted into fermentable glucose (Wyman et al. (2005) *Bioresource Technology* 96:2026-2032; Mosier et al. (2005)*Bioresource Technology* 96:673-86). In general, the yield and hydrolysis rate of cellulose increases when biomass is fractionated under conditions of high temperature and extremes of pH. Under these severe conditions, however, the overall carbohydrate recovery is often compromised due to extensive degradation of the hemicellulose sugars (mainly xylose in hardwood), which comprise a significant fraction of the lignocellulosic feedstock (hardwood: Rughani and McGinnis (1989) *Biotechnol. Bioeng.* 33:681-686; Bakker et al. "Biofuel production from acid-impregnated willow and switchgrass"; 2nd World Conference on Biomass for Energy, Industry and Climate Protection, 10-14 May 2004, Rome, Italy; Li et al. (2005) *Appl. Biochem. Biotechnol.* 125:175-88; Sassner et al. (2005) *Appl. Biochem. Biotechnol.* 121-124:1101-17; Pan et al. (2005) *Biotechnol. Bioeng.* 90:473-81; softwood: Boussaid et al. (1999) *Biotechnol. Bioeng.* 64:284-9; Yang and Wyman (2004) *Bioresource Technol.* 86:88-95; Knauf and Moniruzzaman (2004) *Intl. Sugar J.* 106:147-50; Mosier et al. (2005) *Ibid*). Also, the degradation products generated by extensive hydrolysis (phenol, furans and carboxylic acid) can potentially inhibit further fermentation steps (Palmquist et al. (1999) *Biotechnol. Bioeng.* 63(1):46-55; Klinke et al. (2004) *Appl. Microbiol. Biotechnol.* 66:10-26). Furthermore, severe pre-treatment conditions, including the use of acid catalysts, can chemically alter the nature of the recovered lignin. A consequence of this is a decrease in the suitability of the lignin for some high value applications (Lignin Institute Dialogue Newsletter (2001) 9(1); Lora and Glasser (2002) *Ibid*; Matsushita and Yasuda (2003) *J. Wood Sci.* 49:166-171).

When water is used as the sole fractionation agent, the majority of the hemicellulose sugars can be recovered through autohydrolysis (Garrote and Parajo (2002) *Wood Science Technol.* 36:111-123). However, due to inefficient delignification, this maximization of the hemicellulose sugar yield is usually done at the expense of the cellulose/glucose enzymatic conversion (Negro et al. (2003) *Appl. Biochem. Biotechnol.* 105:87-100; Chung et al. (2005) *Appl. Biochem. Biotechnol.* 121:947-961; Kim and Lee (2006) *Bioresource Biotechnol.* 97:224-232). Use of a second stage oxidative treatment was shown to improve the cellulose/sucrose conversion following the hot water treatment but not always as a result of efficient lignin removal (Brownell and Saddler (1987) *Biotechnol. Bioeng.* 29:228-35; Wyman et al. (2005) *Bioresource Technol.* 96:1959-1966; Kim and Holtzapple (2006) *Bioresource Technol.* 97:583-591).

The efficient removal of lignin under mild conditions can be achieved using the OrganoSolv™ process. This type of pre-treatment involves the use of an aqueous organic solvent, usually ethanol, to achieve the simultaneous removal of the hemicellulose sugar and lignin in separated streams. The cost associated with the use of an ethanol solvent is reduced by producing the ethanol on site and efficiently recycling it, as taught, for example, by U.S. Pat. No. 5,788,812. The conversion rate of the cellulose solid fraction provided by aqueous ethanol pre-treatment is mainly affected by the inefficient removal of the hemicellulose sugar when lower water/solvent ratios are used to maximize the lignin recovery (Holtzapple and Humphrey (1984) *Biotechnol. Bioeng.* 26:670-676; Chum et al., (1988) *Biotechnol. Bioeng.* 31:643-649). Increasing the water/ethanol ratio, or the addition of a chemical catalyst to the solvent, increases the hemicellulose sugar removal but is associated with a reduction of lignin removal and increased hemicellulose sugar degradation (Holtzapple and Humphrey (1984) Ibid; Rughani and McGinnis (1989) Ibid; Pan et al. (2005) Ibid).

Successful advancements in enzyme production technology have resulted in a lower cost of the hydrolytic enzyme required to obtain a high conversion rate of cellulose to glucose. However, because the enzymatic hydrolysis activity is strongly inhibited by the hydrolysis products (sucrose and short cellulose chains), simultaneous fermentation of the released sugar (SSF for simultaneous saccharification and fermentation) can greatly improve the overall cellulose/ethanol conversion using lower enzyme loading. Several technologies are now available that allow a broader use of the biomass at lower cost under a variety of less constraining conditions (reviewed in Lin and Tanaka (2006) *Appl. Microbiol. Biotechnol.* 69:627-642).

Whereas the fermentation of glucose can be carried out efficiently by a variety of organisms, the bioconversion of the pentose fraction (xylose and arabinose) presents a challenge. A lot of attention has therefore been focused on genetically engineering strains that can efficiently utilize pentose and convert them to useful compounds, such as ethanol (reviewed in: Aristidou and Penttila (2000) *Curr. Opin. Biotechnol.* 11:187-198). Alternatively, the pentose fraction which is predominantly xylose in hardwood species such as *Salix*, can be recovered from the water stream and converted to xylitol for use as a valuable food product additive. By-product streams from this process (furfural, acetic acid, para-hydroxybenzoic acid and vanillin) may also be fractionated subject to market price. Furfural, the easiest by-product to market, can be obtained by distillation from the same fraction. The acetic acid may also be recovered to produce peroxyacetic acid for pulp.

Ethanol-soluble lignin is considered to be of higher value because of its ease of recovery and its suitability for a wide range of industrial applications compared with water-soluble lignin, such as that recovered from the Kraft process often employed by the pulp and paper industry. Extraction of Kraft lignin requires high volumes of solvent and has a narrower range of applications (Funaoka et al. (1995) *Biotechnol. Bioeng.* 46:545-552; Lora and Glasser (2002) *J. Polymers Environ.* 10:39-47; Kubo and Kadla (2004) *Macromol.* 37:6904-6911; Lawoko et al. (2005) *Biomacromol.* 6:3467-3473).

Lignin extracted using the OrganoSolv™ process differs significantly from that extracted via the Kraft process. OrganoSolv™ lignin has a molecular weight of 700 to 1550 g/mol, low polydispersity, a glass transition temperature of 70 to 170° C., a high relative amount of phenolic hydroxyl groups, and a low degree of chemical modification (Lora and Glasser (2002) Ibid; Kubo and Kadla (2004) Ibid; Lawoko et al. (2005) Ibid). This lignin can be used in the manufacture of molding compounds, urethane epoxy and formaldehyde resins, antioxidants and controlled-release agents. Ethanol-soluble lignin from hardwoods is recovered by diluting the aqueous ethanol pre-treatment effluent with water and acid to form a solution with a pH of 1.5 to 2.7 and an alcohol content of 30% (v/v) (or a ratio of aqueous-ethanol effluent to the acid water of 0.35 to 0.70). After drying, the precipitated lignin is obtained in the form of a powder (U.S. Pat. No. 5,788,812).

Acid catalyzed OrganoSolv™ pulping was originally developed by Theodor Kleinert as an environmentally preferred alternative to Kraft pulping (U.S. Pat. No. 3,585,104). It was later found that a variation of the operating conditions could very efficiently convert the lignocellulosic material to sugars and lignin. In the 1980s, a 16 liter continuous flow reactor pilot plant that processed bagasse to sugars was built (Dedini, Brazil). A concentrated solution of acetone with a small amount of acid was used to solubilize the lignocellulosic component of the bagasse (U.S. Pat. No. 4,409,032).

An OrganoSolv™ process using aqueous ethanol to produce a clean biofuel for turbine generators was developed by the University of Pennsylvania and the General Electric Company in the 1970s. Subsequent modification by the Canadian pulp and paper industry resulted in the Alcell™ pulping process (U.S. Pat. No. 4,100,016). The long-term economic viability of the Alcell™ process was significantly improved using technology for the recovery of lignin and furfural by-products from the organic pulping liquor (U.S. Pat. Nos. 4,764,596, 5,681,427 and 5,788,812). A commercial Alcell™ pulping plant processing metric tons of hardwood per day was established in 1989 in New Brunswick Canada. The plant was operated for several years but was eventually shut down due to external economic factors. More recently, a patent application was published relating to an integrated operation for processing sugarcane that combines the OrganoSolv™ Alcell™ process, pulping and fermentation to reduce the capital and operating cost by providing a high degree of internal process recycling (US Patent Publication No. US 2002/0069987).

There remains a need in the art for a process for producing ethanol from woody biomass which can be established at a relatively low cost and be profitable by maximizing the yield and recovery of valuable by products such as natural lignin and xylose.

SUMMARY OF THE INVENTION

The present invention provides an integrated process that allows for rapid production of high volumes of biomass, and the efficient and cost-effective use of plant biomass for production of ethanol, natural lignin, xylose and other co-products. The process employs an optimized pre-treatment that allows efficient fractionation of lignin and hemicelluloses without compromising ethanol yield. Due to the high cost associated with biomass production, the optimum utilization of all lignocellulosic components of the feedstock as marketable products is essential in order to obtain ethanol at a commercially competitive price. Due to the complex nature of the lignocellulosic components and the technical difficulties associated with their separation and conversion, a compromise in the recovery of all valuable components is required to reduce the cost of producing sugars from woody biomass.

In one embodiment, the pre-treatment process, which is based on a combination of an OrganoSolv™, or ethanol/water (for example 50% to 80% ethanol in water), treatment and a hot water wash, is optimized for the fractionation of *Salix*, and improves the overall biomass utilization by maximizing the lignin recovery, as well as the overall carbohydrate recovery, without compromising cellulose/glucose conversion. Product recovery under mild conditions is further improved by applying the pre-treatment in a continuous manner (Nagle et al. (2002) *Biotechnol. Prog.* 18:734-738; Yang and Wyman (2004) Ibid; Wyman et al. (2005) Ibid; Liu and Wyman (2005) *Bioresour. Technol.* 96:1978-1985). In addition to improving the yield of each product stream, the economy of the inventive pre-treatment process is improved by avoiding the addition of chemical catalysts which are expensive, require neutralization of solid fractions, chemically modify and reduce the value of the recoverable lignin, and are costly to remove from the liquid stream.

In one embodiment, the inventive process employs hardwood, preferably *Salix* spp, although other plant materials, such as wheat straw, may also be effectively processed using the methods disclosed herein. As a biomass feedstock, *Salix* spp. offer the advantages of requiring low energy input in relation to the biomass produced, being easy to propagate from unrooted cuttings, having genetic diversity and a short breeding cycle, having good winter standing, being inexpensive to harvest and chip, and vigorously re-sprouting after each harvest. In addition, growing of *Salix* requires significantly fewer pesticides than traditional agriculture, uses fewer herbicides than many crops and may be grown for ecosystem restoration (Kuzovkina and Quigley (2005) *Water, Air, and Soil Pollution* 162:183-204). Because *Salix* can grow with ease on marginal land, it is particularly suitable for restoration of used pastoral farming land (Wilkinson (1999) *Biomass Bioenergy* 16:263-275). *Salix* culture can contribute to the reduction of nutrient leaching, soil acidification and erosion, and has been shown to improve the nitrogen balance and increase soil fertility (Hasselgren (1998) *Biomass Bioenergy* 15:71-74; Borjesson (1999) *Biomass Bioenergy* 16:137-154; Roygard et al. (2001) *J. Environ. Qual.* 29:1419-1432). Furthermore, like most woody crops, *Salix* production is carbon dioxide neutral, and is therefore strategically important in efforts to reduce global warming (Lemus and Lal (2005) *Crit. Rev. Plant Sci.* 24:1-21).

The process employs a low boiling solvent, preferably ethanol, for easy lignin recovery and solvent recycling. Ethanol also offers the advantage that it is a product of the processing of cellulose and therefore can be readily recycled as part of the biorefining process. Ethanol pretreatment without the use of an acid catalyst is preferred to achieve high recovery of chemically unmodified natural lignin with higher potential revenues and also to increase the recovery and integrity of the xylan polymer in the subsequent hot water treatment. The disclosed process, which in certain embodiments uses continuous processing, also reduces the recondensation of lignin often seen in a batch reactor by allowing removal of solvent while still at temperatures well above the normal boiling point of the solvent.

In one embodiment, the process disclosed herein includes the following steps:
  (a) contacting a continuous flow of plant material, such as wood chips, with a co-current or counter-current continuous flow of an aqueous ethanol solution (preferably comprising 50% to 80% ethanol) at elevated temperature and pressure (for example at a temperature between 170° C. and 210° C. and a pressure between 19-30 barg) for a period of time sufficient to produce ethanol-soluble lignin and plant pulp material, wherein the plant pulp material is depleted of lignin and has a high concentration of cellulose;
  (b) separating ethanol from the plant pulp material and recovering the ethanol-soluble lignin from the ethanol;
  (c) contacting the plant pulp material with water at elevated temperature and pressure (for example at a temperature between 160° C. and 220° C. and a pressure between 12-25 barg) for a period of time sufficient to remove hemicellulose sugars from the plant pulp material;
  (d) separating the water from the plant pulp material and recovering water-soluble sugars, acetic acid and/or furfural from the water; and.
  (e) contacting the resulting plant pulp material with: (i) an aqueous solution comprising cellulase, β-glucosidase and temperature-tolerant yeast, (ii) yeast growth media, and (iii) buffer, whereby cellulose present in the plant pulp material is hydrolyzed to glucose.

The resulting glucose may then be fermented to produce ethanol, which is in turn recovered by way of distillation and dewatered by technologies such as use of a molecular sieve.

The ethanol pretreatment (step (a)) may be carried out substantially in the absence of an acid catalyst. For example, the reaction mixture may contain less than 1% of an acid catalyst. In certain embodiments, the ethanol pretreatment is carried out at a pH in the range of 3 to 9.5. Similarly, in certain embodiments, the hot water treatment (step (c)) is carried out at a pH in the range of 2 to 7.

Methods for propagating plants of a *Salix* species are also provided herein. In certain embodiments, such methods comprise:
  (a) culturing at least one shoot of a first plant selected from the group consisting of *Salix* species and collecting at least one cutting from the shoot, wherein the cutting contains at least one node;
  (b) cultivating the cutting in a composition for a period of time sufficient to form a second plant, wherein the composition comprises benzyladenine, activated charcoal and at least one medium selected from the group consisting of: Murashige and Skoog medium and McCown Woody Plant medium;
  (c) obtaining at least one subsequent cutting from the second plant, wherein the subsequent cutting contains at least one node; and
  (d) culturing the subsequent cutting in McCown Woody Plant medium for a period of time sufficient to form a subsequent plantlet.

Plants that may be effectively propagated using such methods include, but are not limited to, *S. viminalis* and *S. schwerinii* 'Kinuyanagi'.

These and additional features of the present invention and the manner of obtaining them will become apparent, and the invention will be best understood, by reference to the following more detailed description and the accompanying drawings.

BRIEF DESCRIPTION OF THE FIGURES

FIG. 9A shows the results obtained with the 3 l digestor.

DETAILED DESCRIPTION

As discussed above, the present invention provides an economically-viable integrated process for the biorefining of lignocellulosic material from plants, such as *Salix* spp., to produce ethanol and natural lignin. Other types of feedstock that may be effectively employed in the disclosed process include dedicated short rotation woody or herbaceous biomass (for example, *Miscanthus*, switchgrass), woody and agricultural waste (e.g., wheat straw, rice straw, corn stover or sugar cane bagasse) and dedicated energy crops. In certain embodiments, the plant material is selected from the group consisting of: *Salix*, Poplar, Eucalyptus, switch grass, miscanthus, sugar cane bagasse, soybean stover, corn stover, rice straw, barley straw, wheat straw, corn fiber, wood fiber, and combinations thereof.

As used herein, the term "woody plant" refers to a vascular plant that has at least one stem that is lignified to a high degree. Examples of woody plants include trees and shrubs. *Salix* crops may be grown from micropropagated plants as described below in Example 3. *Salix* species that may be effectively employed in the inventive process include genetically modified species.

In one embodiment, the process employs a continuous flow counter-current or co-current digestor. Use of such a digestor results in faster processing rates, increased throughput and increased efficiency. As such digestors run continuously, they require less maintenance and less labor than batch digestors. In addition, displacement wood pulping is more efficient than batch processes and differential reaction times are possible.

Crops of *Salix* are harvested, air-dried and stockpiled. If reduction of the particle size of the harvested *Salix* is desired prior to processing, this can be achieved using a chipper or similar device. In one embodiment, *Salix* particles of approximately 5 mm to 5 cm in size are employed in the process disclosed herein.

Figure 1:
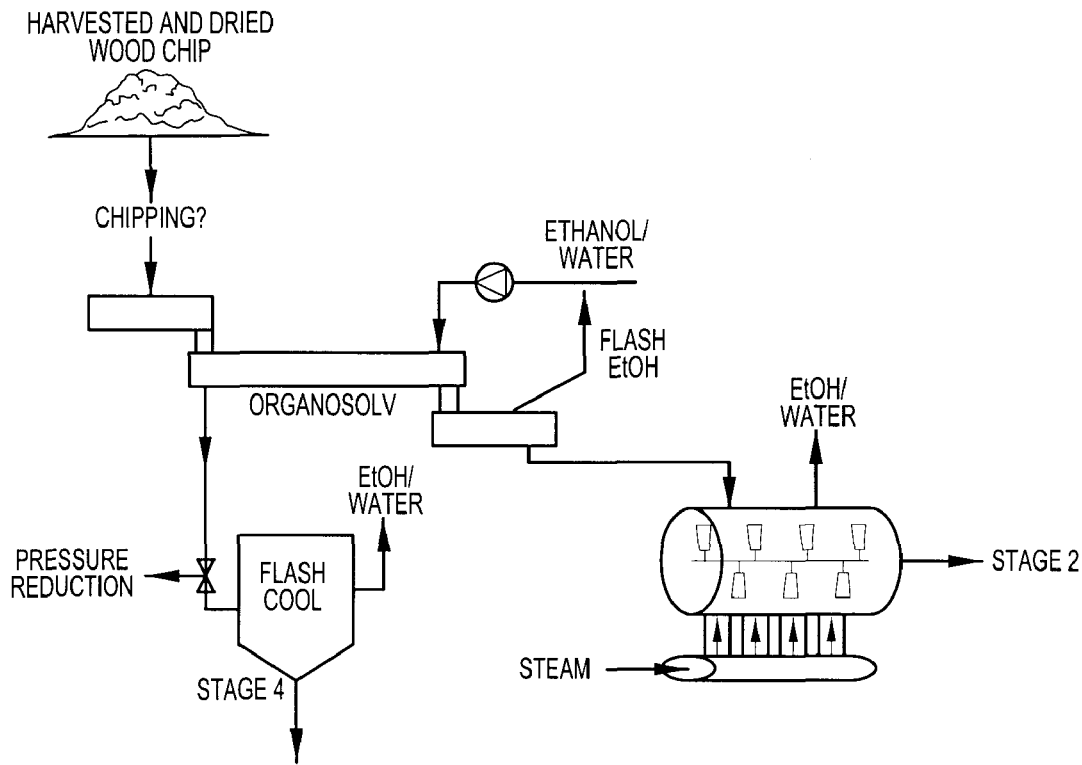
FIG. 1 is a schematic of the first stage (ethanol extraction) of the disclosed integrated process for the production of biofuel from wood chips.

The first stage of the process disclosed herein is an OrganoSolv™, or ethanol, extraction (illustrated schematically in FIG. 1). This involves continuous contacting of the wood chips with a counter-current flow of a solution of up to 70% ethanol in water, undertaken at a temperature of approximately 170° C. to 210° C. and a pressure of 19-30 barg. In one embodiment, the digestor is a screw contactor operating with wood chips being fed and discharged via cup and cone pressure plugs or feed screws. Solvent passes against the flow of solids so that chips exiting the machine are exposed to fresh (solute free) ethanol solution, while chips entering the digestor, which have the highest extractable content, are exposed to the most solute laden solvent solution. Solvent entering the digestor is pressure pumped to maintain the operating pressure therein and to provide the hydraulic drive to pass against the flow of chips. Solvent from within the digestor is re-circulated through external heaters, for example steam heaters, on a continuous basis to bring the wood chips up to the operating temperature quickly and to maintain the temperature. Operating conditions (such as time, temperature profile, pressure and solid/liquid ratio) within the digestor are optimized to provide maximum removal of water insoluble lignin from the wood chips. As the wood chips pass from the digestor and are exposed to lower pressures, a portion of the solvent content therein will evaporate, resulting in cooling of the wood chips.

In an alternative embodiment, the wood chips are displaced in the digestor using gravity in a downward gradient. Solvent entering the digestor is pumped upward passing against the flow of solid.

Chips discharged from this first stage of the process will still contain some ethanol which must be removed prior to the subsequent water extraction. This is achieved by means of a steam stripping operation. The vapors are recovered from both this operation and from the flash evaporation of depressurized solids, noted above, and are re-used directly with the fresh solvent stream. In this way the latent heat content of the vapors is recovered.

Figure 2:
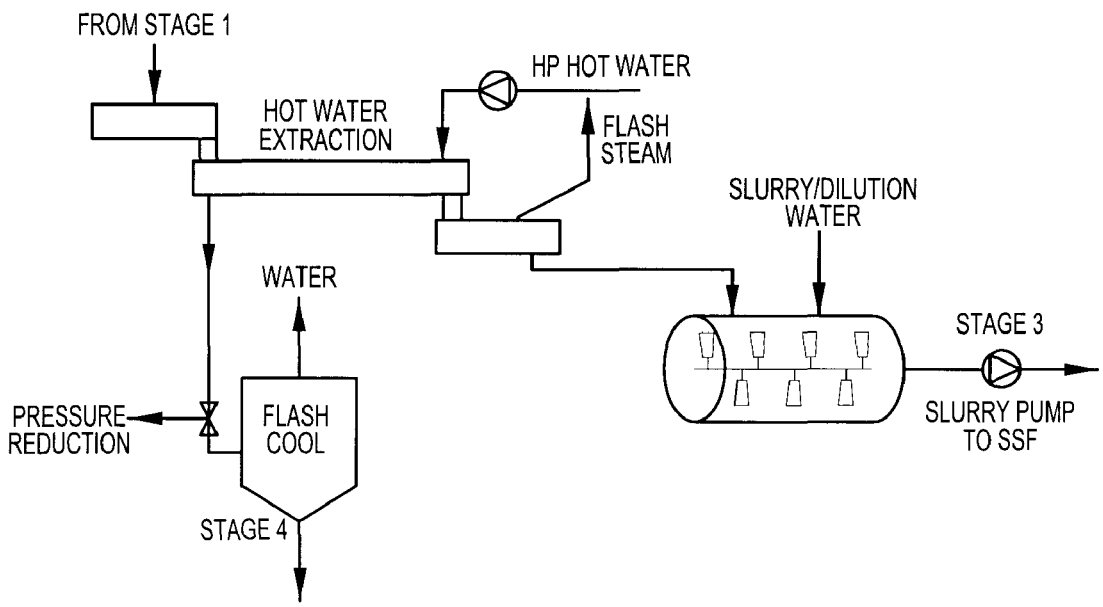
FIG. 2 is a schematic of the second stage (hot water treatment) of the disclosed integrated process for the production of biofuel from wood chips.

The de-solventized and lignin-depleted chips then pass into a second stage of extraction (illustrated schematically in FIG. 2) undertaken in comparable equipment, and in a comparable fashion to the ethanol extraction described above, with the difference being that high pressure hot water (preferably at a pressure of approximately 12 to 25 barg and a temperature of approximately 180° C. to 220° C.) is utilized to solubilize the xylose fraction of the chips.

As the solids exit the hot water digestor and the pressure is reduced, flash evaporation of steam will occur. This is recovered for direct re-use with the fresh hot water entering as fresh extraction solvent at the solids discharge end of the digestor. The chips will be cooled as a result of this flash evaporation.

Figure 3:
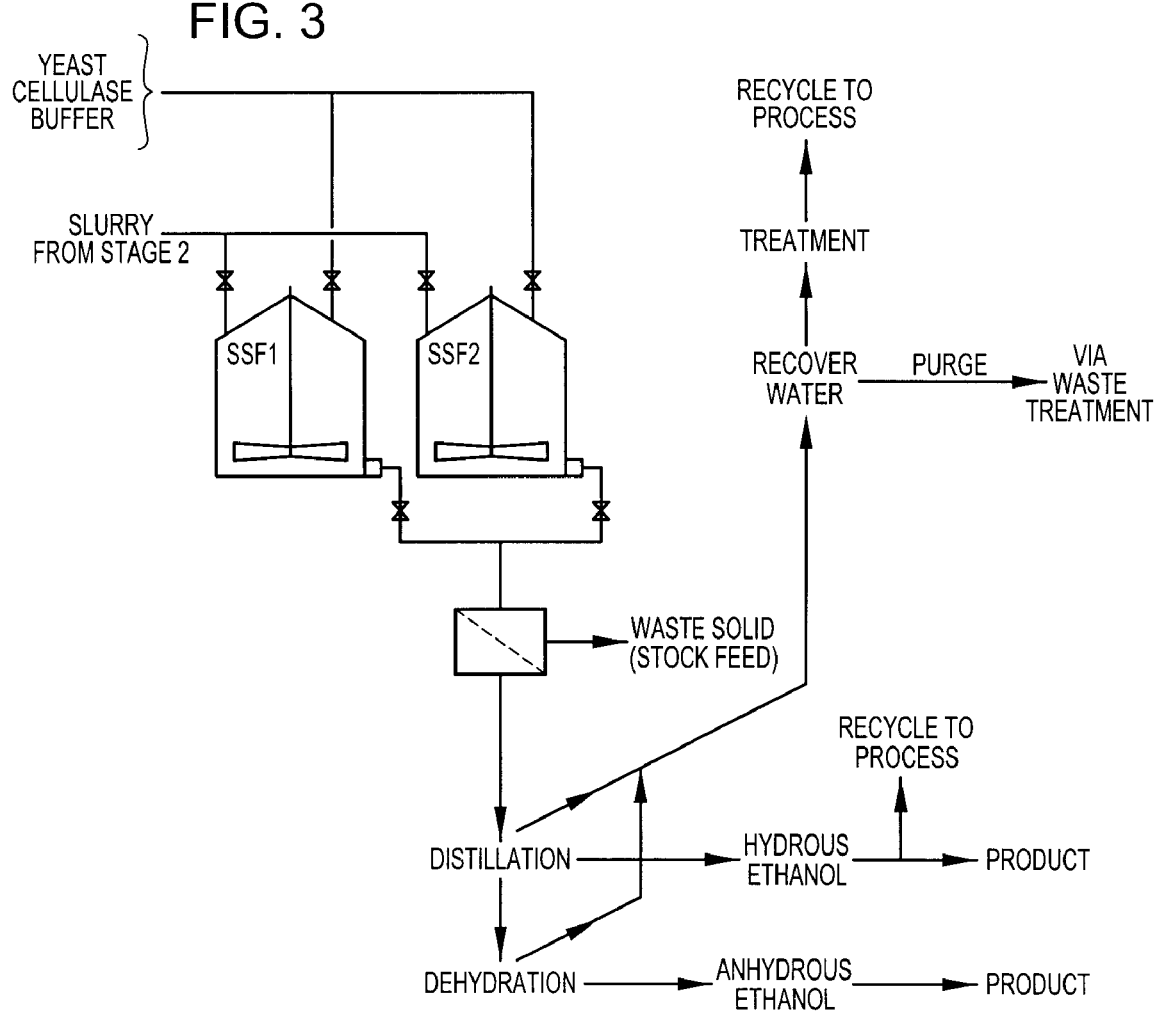
FIG. 3 is a schematic of the third stage (simultaneous saccharification and fermentation) of the disclosed integrated process for the production of biofuel from wood chips.

What remains of the initial wood chips after two stages of extraction will be primarily cellulose in a hydrolyzable pulp. This material is transferred to one of a series of batch SSF (simultaneous saccharification and fermentation) vessels, together with temperature-tolerant yeast, yeast growth media, cellulase, β-glucosidase, buffer and water to dilute the solids to the required solid/liquid ratio (illustrated schematically in FIG. 3). In these vessels, the cellulose is hydrolyzed to produce glucose, which is in turn fermented to produce ethanol. Low levels of ethanol are maintained in the fermentor by continuous removal of the produced ethanol to avoid fermentation inhibition. The process is optimized for maximum cellulose hydrolysis and fermentation to ethanol. The vessel contents at the end of the batch fermentation will be discharged via a filter and the retained solids will be recovered for disposal as cattle feed. Residual components in this fraction may also be recovered.

The filtrate, consisting primarily of ethanol and water, is concentrated to produce hydrous and/or anhydrous ethanol as desired, using methods well known to those of skill in the art. A portion of the hydrous ethanol product is re-utilized in the first, ethanol extraction, stage.

Figure 4:
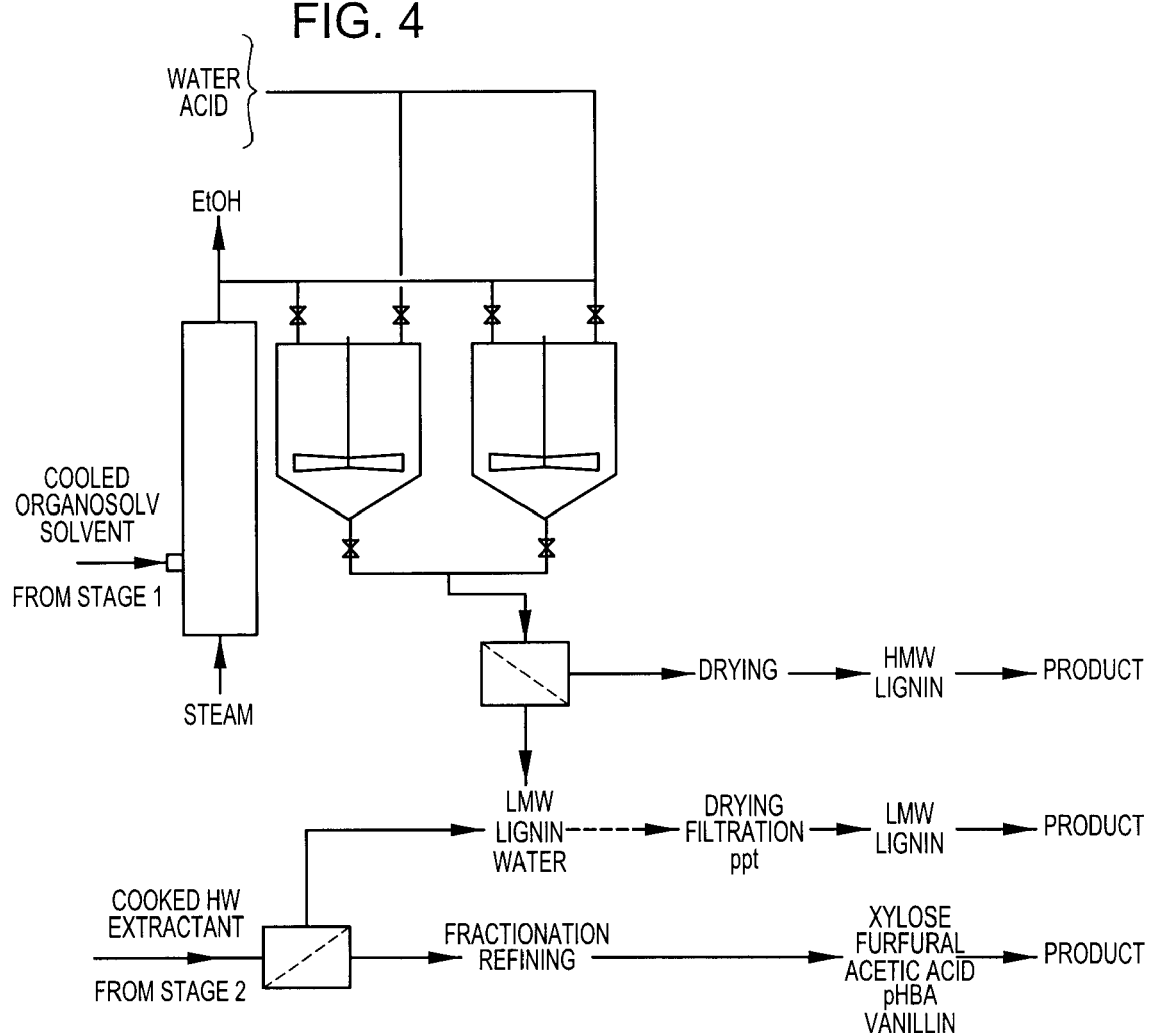
FIG. 4 is a schematic of the fourth stage (product separation/purification) of the disclosed integrated process for the production of biofuel from wood chips.

Additional products are separated and purified as illustrated schematically in FIG. 4 and discussed in detail below.

Lignin Recovery

The black liquor (ethanol/water/lignin solution) exiting the ethanol digester in the first stage is depressurized before passing to a flash cooling vessel in which the solvent (primarily ethanol) is evaporated. Further ethanol is then steam-stripped from the liquor prior to transfer to one of a series of batch vessels in which precipitation of lignin from the liquor is promoted through dilution (3 to 10 times) with water and lowering of pH (<3) by acid addition. The resulting lignin precipitate is then separated by filtration and dried as a crude product stream. The aqueous filtrate is combined with the hot water stream for xylose and water soluble product recovery.

Xylose Recovery

The hot water extraction product stream from the second stage containing primarily xylose (with some low molecular weight lignin, some glucose, and other C5 and C6 sugars) is depressurized before cooling by flash evaporation of water. As the temperature is dropped, the low molecular weight compounds and molecules precipitate from solution. These are then separated by filtration.

The filtrate from the low molecular weight filtration contains the xylose fraction as well as a range of other components including furfural, acetic acid, para-hydroxybenzoic acid and vanillin. An additional module carries out concentration, decolorization, deionization and chromatography steps, and produces pure xylose.

Solvent Recycling

The ethanol and water streams can be recycled through the pulp biomass to increase product concentration, or processed for product recovery. Subject to processing conditions during the two extraction operations, varying degrees of at least acetic acid and/or furfural will be contained in the stream passing to the ethanol concentrator. These fractions from the ethanol/water distillation can be concentrated and recovered using methods well known in the art.

The following examples are offered by way of illustration and not by way of limitation.

EXAMPLE 1

Biorefining of Salix Biomass

Preparation and Composition Analysis of Untreated Salix Biomass

Stems of Salix viminalis or Salix schwerinii 'Kinuyanagi' were chipped with a garden mulcher. The wood chips were dried at 40° C. for 24 hours and sieved by hand between two wire meshes of British test sieve with apertures of 2.8 and 4 mm. The composition of the sieved and unsieved Salix chips was assessed, with the results being shown in Table 1. The mass composition was assessed using laboratory analytical procedures (LAPs) developed by the National Renewable Energy Laboratory (NREL, Golden, Colo.). Values are expressed as gram of component per 100 g of dry untreated chips. Extractives were isolated using a Soxhlet extractor, dried and weighed. Lignin concentrations were determined after chemical hydrolysis of the Salix chips (4 hours with 72% sulfuric acid at 102° C.). Acid soluble lignin was measured by densitometry at 320 nm and the concentration of the non-acid soluble lignin was measured by weight minus ash. The percentage of glucan and xylan present in the samples were determined after chemical hydrolysis (4 hours with 72% sulfuric acid at 102° C.). Acid soluble sugar was measured by HPLC using the appropriate range of xylose and glucose standards.

TABLE 1

Composition of untreated Salix biomass

| Salix variety | Extractive (%) | Lignin (%) | | | Sugar (%) | |
|---|---|---|---|---|---|---|
| | | Soluble | Insoluble | Total | Glucan | Xylan |
| Salix viminalis* | 16 | 2 | 31 | 33 | 23 | 9 |
| Salix viminalis | 8 | 3 | 24 | 27 | 34 | 8 |
| Salix schwerinii | 6 | 5 | 23 | 28 | 32 | 14 |
| Salix schwerinii Kinuyanagi | 4 | 5 | 22 | 27 | 33 | 12 |
| Salix schwerinii Kinuyanagi | 4 | 3 | 25 | 28 | 33 | 9 |
| Salix schwerinii Kinuyanagi + Salix viminalis | 2 | 4 | 28 | 32 | 35 | 9 |
| Salix schwerinii Kinuyanagi + Salix viminalis | 2 | 4 | 25 | 29 | 30 | 8 |
| Average | 6 | 4 | 25 | 29 | 31 | 10 |
| Standard Deviation | 5 | 1 | 3 | 3 | 4 | 2 |

(*= Sieved material)

Pre-Treatment of Salix Biomass

Figure 5:
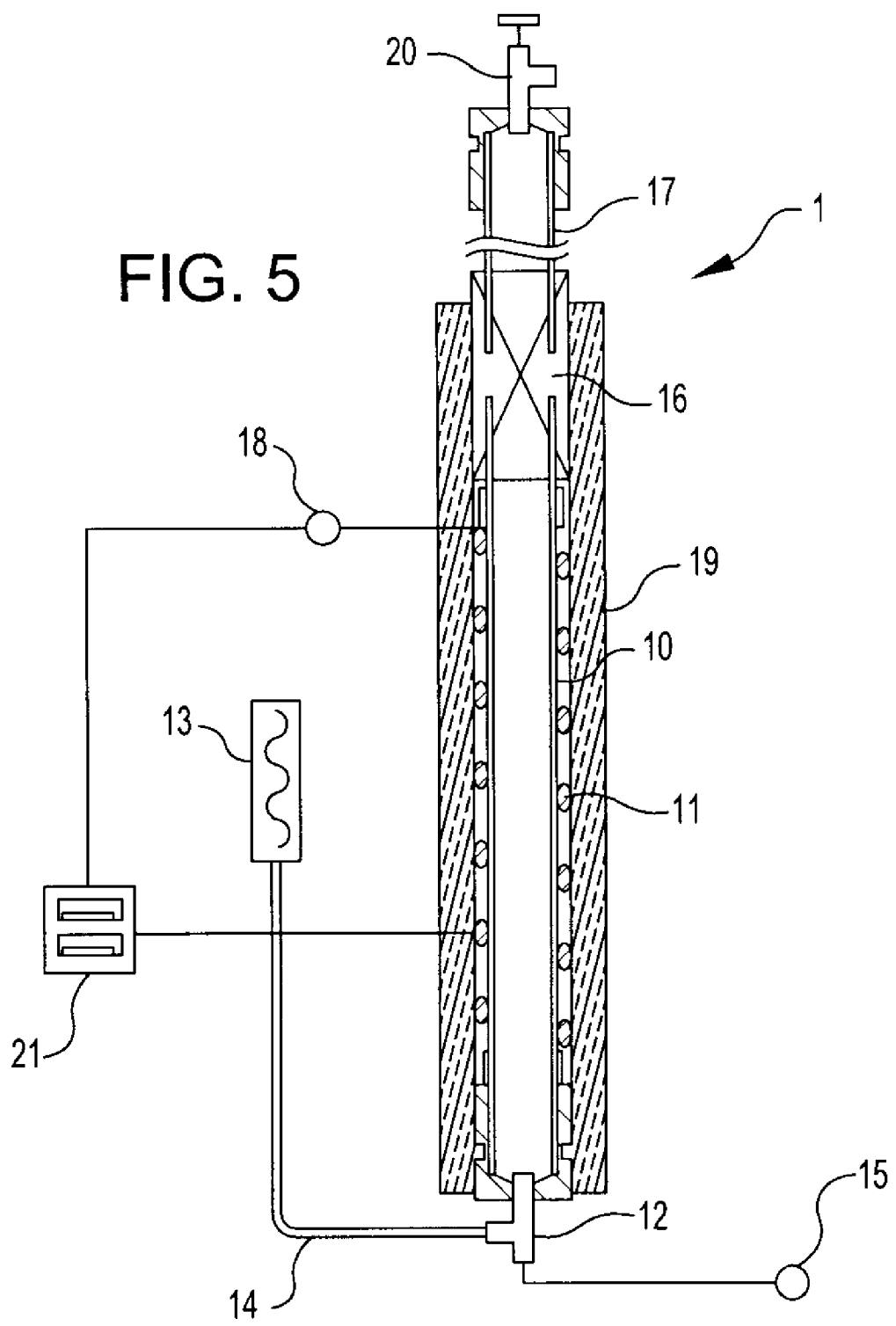
FIG. 5 is a schematic of an experimental 100 ml digestor for the pre-treatment of biomass.

The pre-treatment of Salix chips was tested in 100 ml experimental digestor and 3 l packed-bed experimental digestor that were able to process 6 g and 300 g of dry wood chips, respectively. The design of these two digestors is illustrated in FIG. 5 (100 ml digestor) and FIG. 6 (3 l packed-bed digestor). A 40 l digestor was also designed and tested for the recovery of natural lignin from Salix biomass at larger scale (FIG. 7). This 40 l digestor is able to process 6 kg of dry biomass.

Description of the 100 ml Experimental Digestor (FIG. 5)

The 100 ml capacity experimental pre-treatment digestor 1 consisted of a one inch tube 10 with an externally coiled heating coil 11 and fiberglass insulation 19. Tube 10 was connected to a Swagelok™ end-cap 12 which in turn was connected to a welded pressure transducer 13 by means of a ¼ inch tube 14 and to a thermocouple port 15. The other end of tube 10 was connected to a one inch integral bonnet needle valve 16 connected to a collection tube 17 of the same length, which in turn was connected to a ¼ inch integral bonnet needle valve 20. The temperature was controlled by a thermocouple 18 wedged underneath the heating coil and connected to a controller 21. This configuration facilitated the removal of solvent at a temperature well above the boiling point of the solvent.

Operation of the 100 ml Experimental Pre-Treatment Digestor

For the ethanol pre-treatment, the digestor of FIG. 5 was loaded with 6.54 g of dried wood chips and 83.5 ml of ethanol (50 to 70%). The digestor was sealed at all Swagelok™ fittings and the bonnet needle valve closed. The digestor was then heated to the selected process temperature (170° C.-195° C.) while being agitated manually to ensure that the process reached equilibrium quickly. Once the desired temperature was reached, the reaction was allowed to proceed for 60 minutes with periodic manual agitation. At the end of the reaction time, the digestor was inverted and the bonnet needle valve opened to allow the solvent to drain into the collection tube. A fine mesh, positioned in the digestor against the valve, retained the solid fraction in the reaction vessel. The content of the digestor was cooled down and the solvent was removed from the collection tube.

For the hot water treatment, the digestor was filled with 90 ml of wash water, sealed and heated to a specified temperature in the range of 180 to 220° C. After the desired incubation time at the target temperature, the hot water was removed using the same method as described for solvent removal. The remaining pulp was dried and submitted to hydrolysis.

Figure 6:
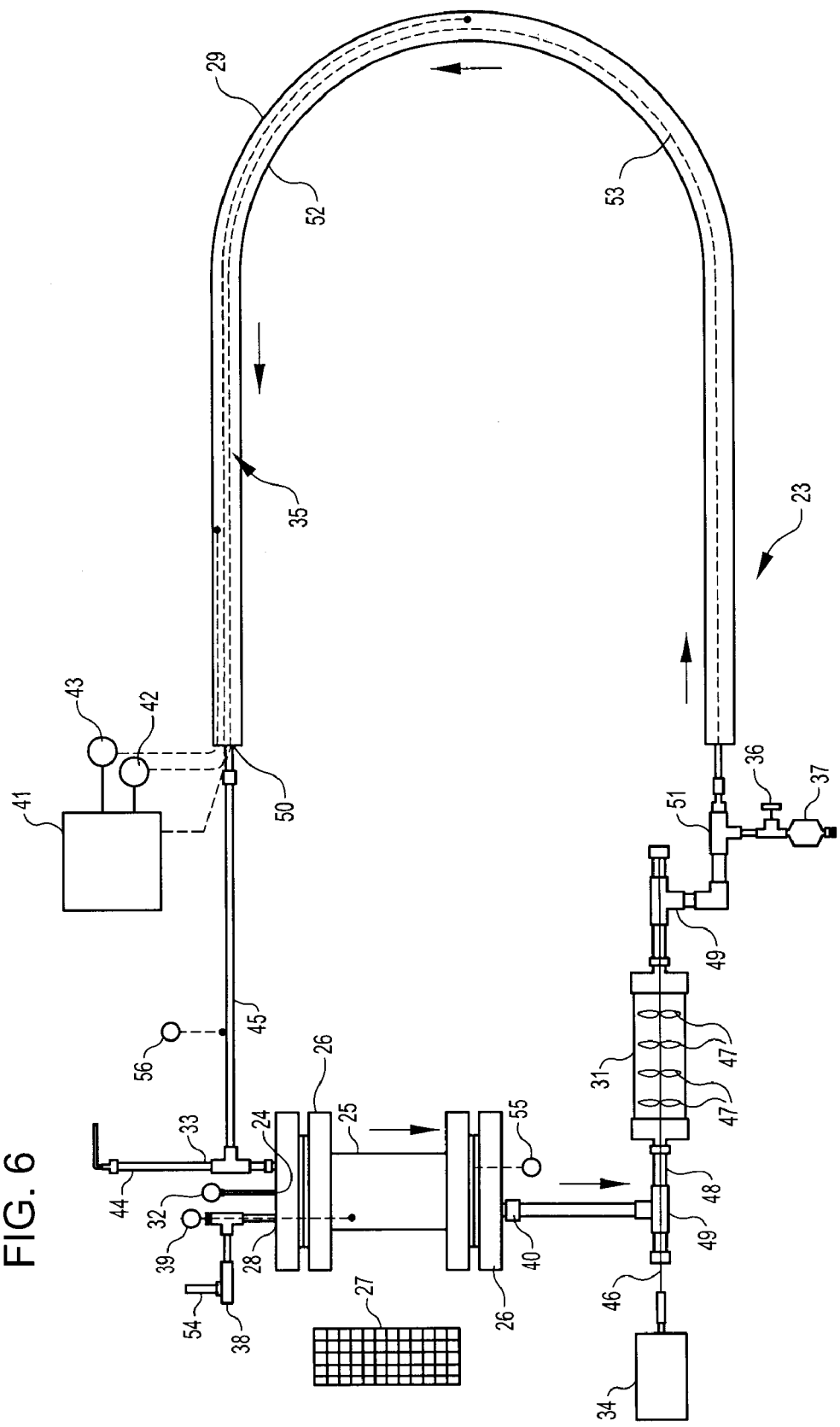
FIG. 6 shows a schematic of a 3 l packed-bed experimental digestor for the pre-treatment of biomass.
Figure 7:
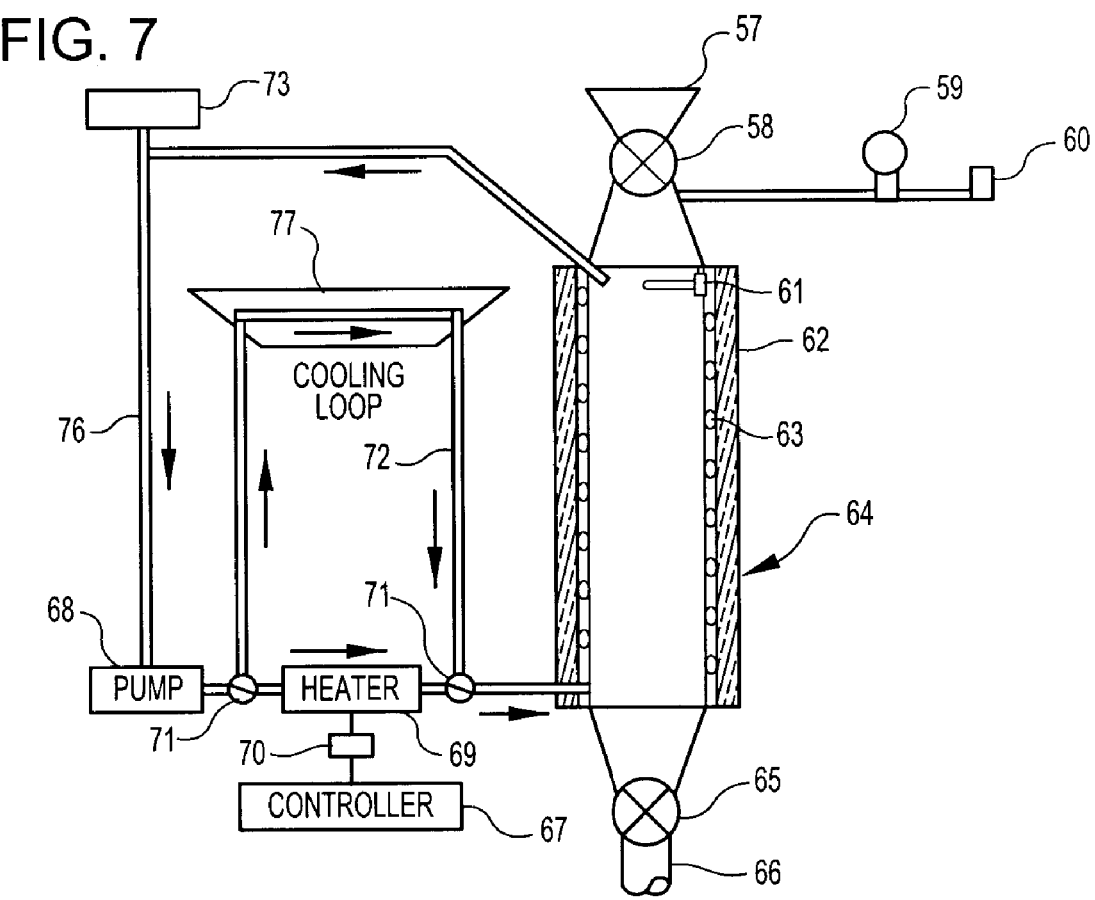
FIG. 7 is a schematic of a 40 l batch experimental digestor for the pre-treatment of biomass.

Description of the 3 l Packed-bed Digestor (FIG. 6)

The 3 l packed-bed digestor 23 shown in FIG. 6 consisted of a stainless steel digestion chamber 25 housing a wire mesh sample basket 27 and sealed with Swagelok™ end cap fittings 26. There were four outlets and two inlets from the digestion chamber 25. A ¼" tube outlet 24 connected the digestion chamber 25 to a pressure transducer 32. A ½" tube pressure relief valve outlet 28 housed a pressure thermocouple 39 measuring the pressure in digestion chamber 25, and was connected to a 50 barg pressure relief valve 38 and a water tank inlet 54. A ¾" tube circulating fluid inlet 33 allowed re-circulation of fluids into digestion chamber 25 and application of pressure from a pressurized nitrogen cylinder through a nitrogen cylinder connector 44. A 1" tube circulating fluid outlet 40 allowed re-circulation of circulating fluids out of digestion chamber 25 and a ⅛" tube thermocouple inlet 55 measured the temperature inside the digestion chamber 25. A thermocouple 56 connected to a circulating fluid tube 45 measured the temperature of the circulating fluid in the circulating fluid tube.

A motor 34 rotated a shaft 46 housed in a 2" tube 48 that was connected to a variable speed drive pump 31 containing four propellers 47 and sealed using several ECOFLON$_2$ rotary seals. Pump shaft T pieces 49 held the 2" tube 48 in place. When shaft 46 is rotated at a speed of 1,400-2,800 rpm, fluid is forced through pump 31 and circulated through heating loop 29 containing a heater construction 35, and through the digestion chamber 25 to enable co- or counter-current continuous flow.

A recycle line T piece 51 was connected to a needle valve 36 and a 10 ml bottle 37 to enable taking of circulating fluid samples when the digestor is operating. To take a sample of circulating fluid, valve 36 was opened and bottle 37 filled. The valve 36 was then closed, and bottle 37 was cooled and removed for sample analysis.

The heater construction 35 consisted of a ¾" heating tube 52 with six electrical heating elements 53 sealed onto it with conductive cement. The heating elements 53 were connected to a controller 41, which was connected to a control thermocouple 42 measuring the temperature of the circulating fluid in the middle of heating loop 29, and an over-temperature controller 43 set at 250° C. and measuring the temperature of the circulating fluid near an outlet 50 of heating loop 29. The heating tube 52 was insulated with fiberglass.

Operation of the 3 l Packed-bed Digestor

The 3 l packed-bed digestor shown in FIG. 6 functioned under the same principle as the 100 ml digestor with the exception that the digestion chamber 25 contained the biomass within wire mesh sample basket 27 and the solvent was circulated within the heating loop 29 by way of variable speed drive pump 31. The solvent was heated electrically to ensure that the target temperature for digestion was reached. The kinetics of the extraction process was determined by collecting samples of the mobile solvent by way of needle valve 36 and 10 ml bottle 37 situated downstream of the pump.

The chipped wood feedstock (up to 300 g) was placed in the wire mesh sample basket 27, which fitted tightly inside the vessel. The vessel with the sample basket was filled with up to 3 l of solvent, and the reactor was sealed tightly with Swagelok™ fittings. The recycle loop was filled with liquid by adding water through the water tank inlet 54. When the reactor was sealed completely, the circulator and temperature controllers were switched on. The pressure transducer 32, thermocouples 39 and 55 in the reactor, and thermocouple 56 on the tube surface 45 were monitored using a PicoLog Recorder (Pico Technology, Cambridge, UK).

Description and Operation of the 40 l Batch Digestor (FIG. 7)

The 40 l packed-bed digestor shown in FIG. 7 was fabricated from a section of 210 mm high-pressure mild steel tubing which formed a reactor vessel 64. A surrounding 300 mm tube formed a heating coil 63 which was partitioned by a spiral steel baffle into a spiral flow channel. The reactor vessel 64 and heating coil 63 were surrounded by glass fiber insulation 62. The heating coil 63 was connected to an oil heating circuit 76 and oil inside the oil heating circuit 76 was heated by a heater 69 driven by 6 kW of electrical heating elements. The oil was circulated through the oil heating circuit 76 by a pump 68, and could also be diverted by two loop valves 71 to a cooling loop 72 immersed in a water bath 77 to enable faster cooling of the reactor vessel 64. The heater and pump were controlled by a thermostat 70 and a process controller 67. An oil reservoir 73 connected to the oil heating circuit 76 was used to accommodate thermal expansion of the oil. In operation, the reactor vessel 64 was filled with about 6 kg of *Salix* biomass and 30 to 40 liters of 70% ethanol via a funnel 57 and an upper ball valve 58. The reactor vessel 64 was then sealed and heated, taking 3 to 4 hours to reach operating temperature (185° C.). The temperature was monitored by a temperature probe 61 and the pressure by a pressure gauge 59. The pressure gauge was connected to a pressure relief valve 60. A sampling port 66 was attached to a lower ball valve 65 in the reactor vessel 64. To enable time-course samples of the liquid phase to be taken during the extraction step, a liquid sampling valve (not shown) can be attached to the sampling port 66. After the appropriate residence time, oil circulation was switched to the cooling loop 72 by means of the loop valves 71 and the reactor vessel 64 allowed to cool. After removal of the liquid sampling valve 74, the treated biomass in the form of lignin-containing black liquor was drained from the reactor vessel 64 by means of the lower ball valve 65 and sampling port 66, and washed with 70% ethanol and water to remove additional lignin. Alternatively, attachment of a steam explosion valve (not shown) to the sampling port 66 enabled a steam explosion step to be performed on the biomass while still at high temperature and pressure.

Results
Mass Balance

Using the experimental digestors as described above, *Salix* biomass was fractionated into two fractions: 1) an ethanol and/or water soluble fraction (hydrolysate, Hyd.), and 2) a solid fraction (pulp). Table 2 represents the mass partition of the *Salix* chips following various pre-treatment sequences. Treatments were done with 70% ethanol at 170° C. to 190° C. for 60 minutes either before or after water treatments performed for 30 min at 170° C. to 190° C. In this example, all pre-treatment experiments were initiated with 6.54 g of dry *Salix* chips (n=3–5) in the 100 ml digestor. The mass in the hydrolysate represents the dry mass (DM) recovered after evaporation of hydrolysate, and the mass in the pulp fraction corresponded to the DM of the residual insoluble material yielded after each pre-treatment. These results show that the addition of a second pre-treatment increased the displacement of mass by 10% toward the hydrolysate and that the sequence in which the two treatments are performed does not have a great impact on the final amount of mass displaced.

TABLE 2

Mass balance of pre-treated *Salix* biomass

| Treatment | Mass in hydrolysate | | Mass in pulp fraction | |
|---|---|---|---|---|
| | g ± Std Dev | % ± Std Dev | g ± Std Dev | % ± Std Dev |
| Organosolv ™ | 1.87 ± 0.26 | 28.53 ± 4.04 | 4.79 ± 0.06 | 73.24 ± 0.92 |
| Hot water | 1.72 ± 0.19 | 26.24 ± 2.91 | 4.53 ± 0.07 | 69.27 ± 1.07 |
| Organosolv ™- Hot water | 2.91 ± 0.32 | 44.40 ± 5.00 | 3.81 ± 0.05 | 58.26 ± 1.68 |
| Hot water- Organosolv ™ | 2.75 ± 0.26 | 41.96 ± 3.93 | 3.72 ± 0.05 | 56.88 ± 1.83 |

Figure 10:
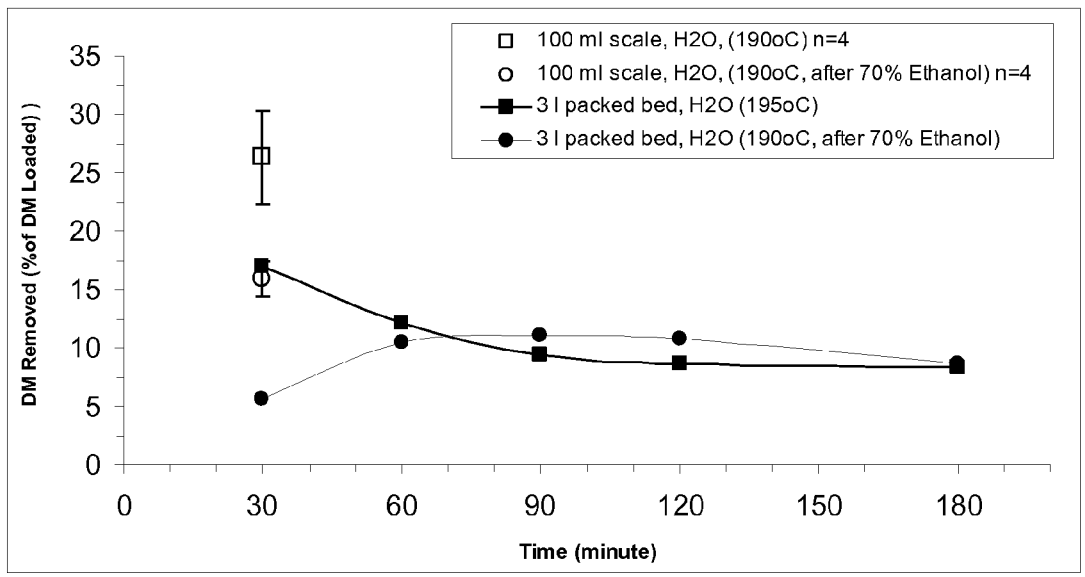
FIG. 10 is a graph showing the effect of time on the DM removed from *Salix* chips with water solvent applied as a primary treatment or after an ethanol treatment at two different scales (100 ml, 3 l), expressed as a percentage of the initial DM loaded.

The kinetics of mass removal during the primary treatment with 70% ethanol was studied in the 3 l packed-bed digestor. FIG. 10 presents the average amount of DM removed (expressed as a percentage of the initial DM loaded) in a set of five experiments performed in the 3 l packed-bed digestor with 70% ethanol for 60 to 480 minutes at a temperature varying between 175° C. and 195° C. This set of data, obtained from the pre-treatment of 250 g of dry *Salix* chips, was compared with the percentage of mass removed with 70% ethanol using the smaller (100 ml; 6.54 g) or larger (40 l batch; 30 to 40 kg) digestors at various times.

Figure 8:
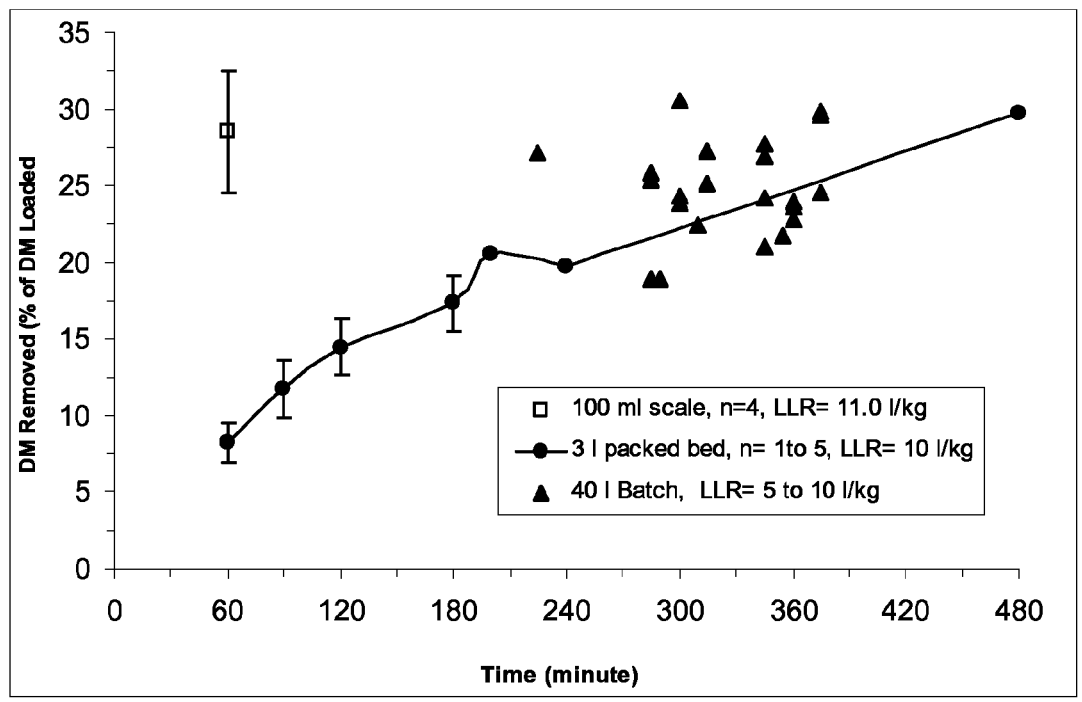
FIG. 8 is a graph showing the effect of time on the DM (dry mass) removed from *Salix* chips with 70% ethanol solvent at three different scales (100 ml, 3 l and 40 l), expressed as a percentage of the initial DM loaded.
Figure 9A:
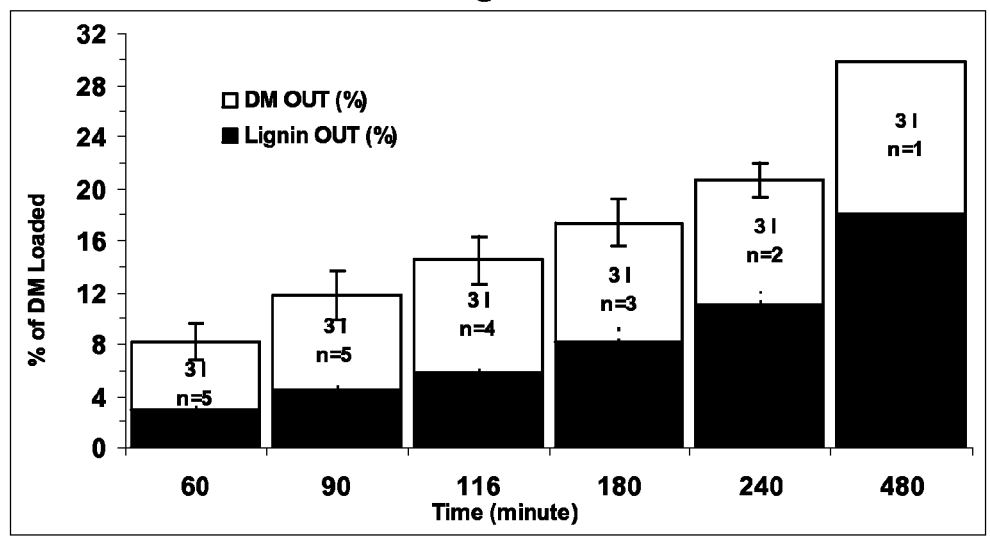
FIGS. 9A and B shows the ratio of DM and lignin removed from *Salix* chips with 70% ethanol and expressed as a percentage of the initial DM loaded.
Figure 9B:
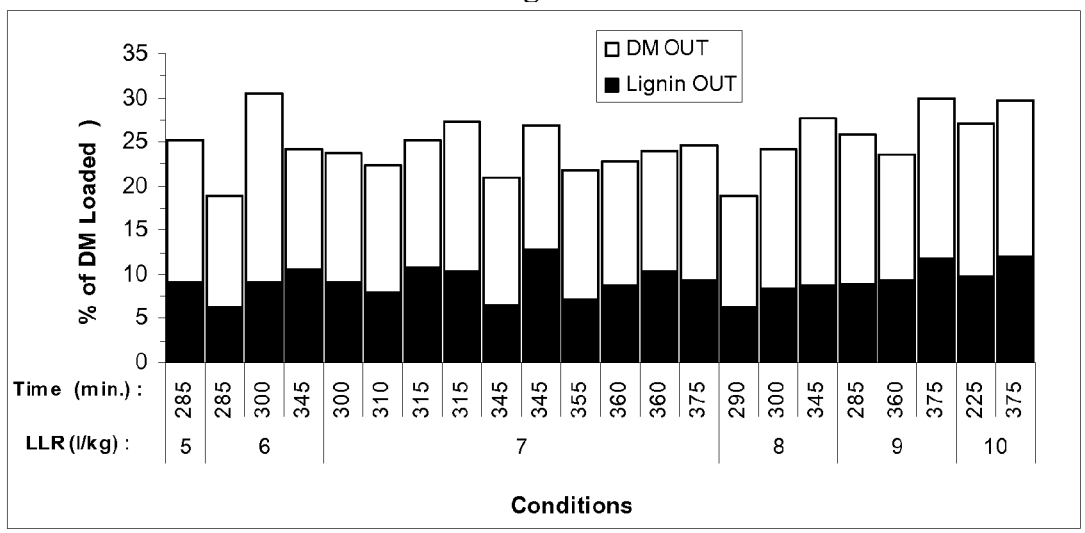
FIG. 9B shows the results from individual experiments in the 40 l batch digestor.

FIG. 8 shows that a three times longer incubation was required using the 3 l packed-bed digestor to remove comparable amounts of dry matter as the smaller, 100 ml digestor in 60 min. Therefore, incubation times varying between 200 and 400 minutes were assayed for optimum mass removal in the larger 40 l digestor. As shown in FIG. 8, in this range of incubation time, 20 to 30% of the input DM was efficiently removed with 70% ethanol at the 40 l scale. FIG. 9 illustrates the ratio of dry matter and lignin removed by the 70% ethanol as the percentage of the DM loaded, with the results for the 3 l digestor being shown in FIG. 9A and the results for the 40 l batch digestor being shown in FIG. 9B. The average DM removed in 22 extractions with 70% ethanol in the 40 l batch digestor (FIG. 9B) was 25%±3 in a running time varying between 200 and 400 minutes at an initial liquid loading ratio (iLLR; 1 solvent per kg iDM).

FIG. 10 presents the ratio of DM removed when untreated *Salix* dry chips and *Salix* dry chips pre-treated with 70% ethanol were treated with hot water (170° C. to 195° C.) in the 100 ml and 3 l digestors. As seen earlier with the 70% ethanol treatment, the ratio of DM remove removed was lower when using the 3 l packed-bed as compared with the smaller 100 ml digestor. FIG. 10 also shows that an increased incubation time of the untreated chips in the hot water did not result in an increase of DM removed as it did for longer incubation in 70% ethanol (shown in FIG. 8). As in the 100 ml digestor, when the hot water treatment of *Salix* chips that were pre-treated with 70% ethanol was performed in the 3 l packed-bed digestor, an additional 10% of DM removal was achieved.

Mass Composition

The Organosolv™/hot water sequence gave optimum lignin and sugar recovery. Table 3 below shows the representative composition of the hydrolysate and pulp fraction obtained after sequential treatment of 6.54 g, 250 g or 35 kg of *Salix* chips with 70% ethanol at 175° C. to 195° C. for 60 to 345 minutes followed by water treatment at 170° C. to 195° C. for 30 to 375 minutes.

The composition of the comparative untreated *Salix* was the average of the analysis of untreated *Salix* varieties described in Table 1. The concentration of lignin in the hydrolysate sample was determined after aqueous acid precipitation of the lignin, separation and drying and weighting of the precipitate lignin. This weight measurement of lignin concentration was shown to correlate with measurement obtained by size exclusion chromatography of the same precipitated lignin and interpretation of the retention time with reference to appropriate pre-run peptide standards. The glucose and xylan concentration in the hydrolysate was directly measured by HPLC using the appropriate range of standards. The composition of the pulp was assessed as described earlier for the untreated *Salix* chips.

Lignin Recovery

At all scales (100 ml, 3 l packed-bed, and 40 l batch), the sequential 70% ethanol and hot water treatment resulted in the removal of over 30% of the total lignin content of the untreated chips (Table 3 below). The majority of the lignin (28 to 32%) was solubilized during the primary treatment with 70% ethanol solvent and an additional 3 to 8% of the initial lignin was removed in the subsequent water treatment.

Figure 11:
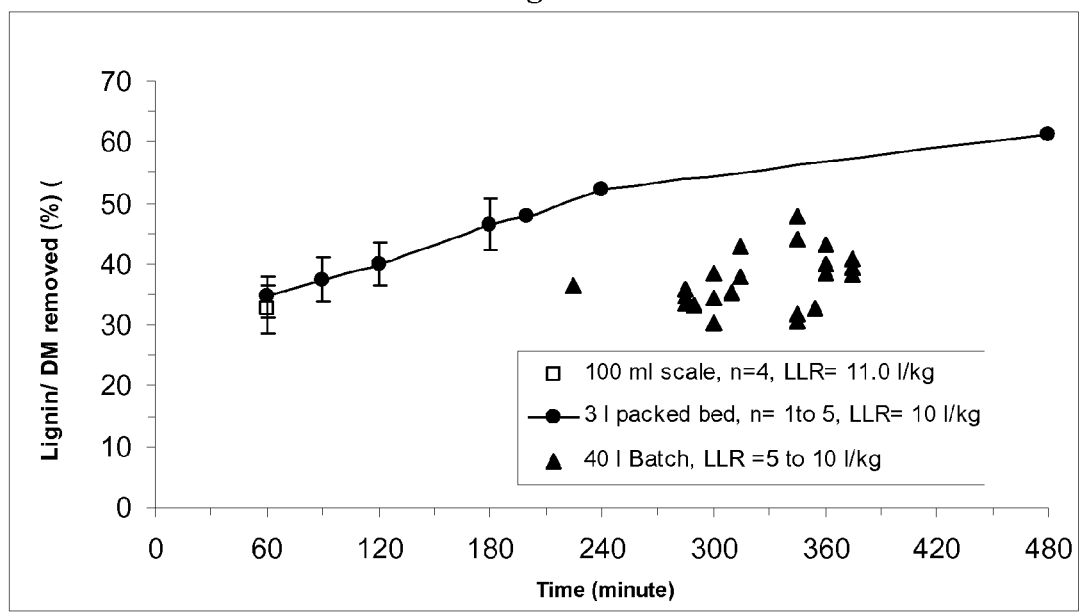
FIG. 11 is a graph showing the proportion of lignin in the DM removed from *Salix* chips with 70% ethanol in three different scales (100 ml, 3 l and 40 l), expressed as a percentage of the total DM removed.
Figure 12:
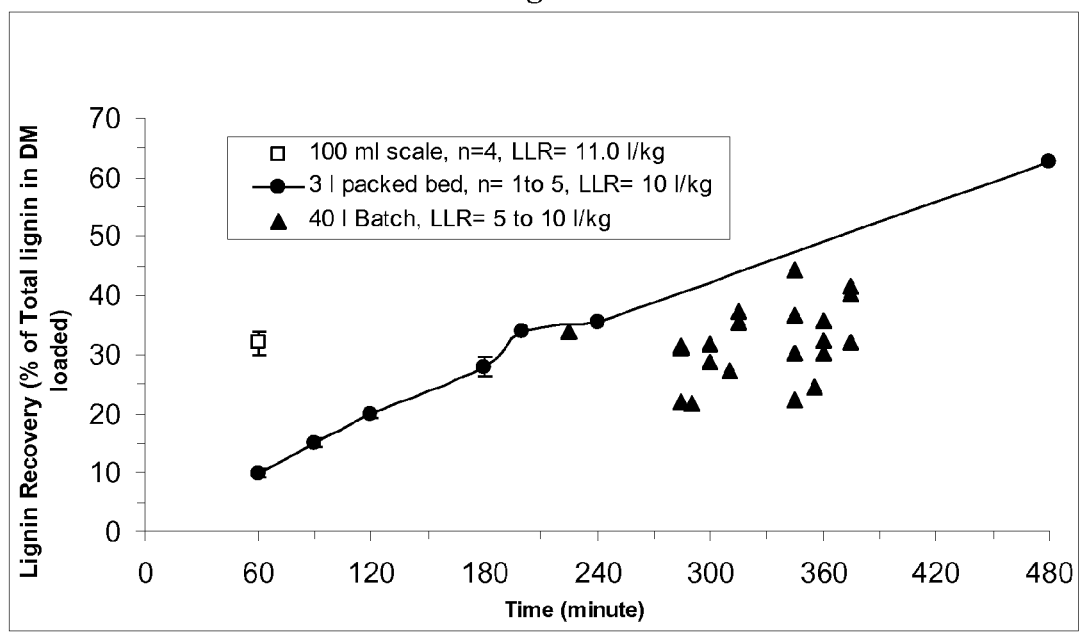
FIG. 12 is a graph showing the proportion of the total available lignin recovered after pre-treatment of the *Salix* chips with 70% ethanol in the 100 ml, 3 l and 40 l digestors, expressed as a percentage of the lignin content in the untreated chips.

As shown in FIG. 11, the ratio of lignin to DM removed by the 70% ethanol treatment reached 35% in the first hour of treatment at a temperature of 170° C. to 190° C. using the 100 ml and the 3 l packed-bed digestors. The lignin composition of the DM removed in the 3 l packed-bed digestor during the second hour of treatment increased by 5% and reached 50% after 4 hours. After 8 hours, the lignin content of the DM removed increased only by another 10% to reach 60%. FIG. 11 also shows that, in the 40 l batch digestor, the ratio of lignin to DM removed varied between 30 to 48% when *Salix* dry chips were treated with 70% ethanol solvent. FIG. 12 illustrates the proportion of the total lignin content in the untreated chips that was recovered in the 70% ethanol solvent using each of the three digestors. The higher recovery of lignin (32%±3) in 60 minutes, using the smaller 100 ml digestor, reflects the higher rate of DM removal achieved with this digestor. With the 3 l packed-bed digestor, similar recovery was achieved within 200 to 240 minutes of treatment.

The amount of lignin recovered using the 40 l batch digestor varied between 22 and 44% of the initial lignin content of the *Salix* chips corresponding to 6 to 13% of the initially DM loaded.

Figure 13:
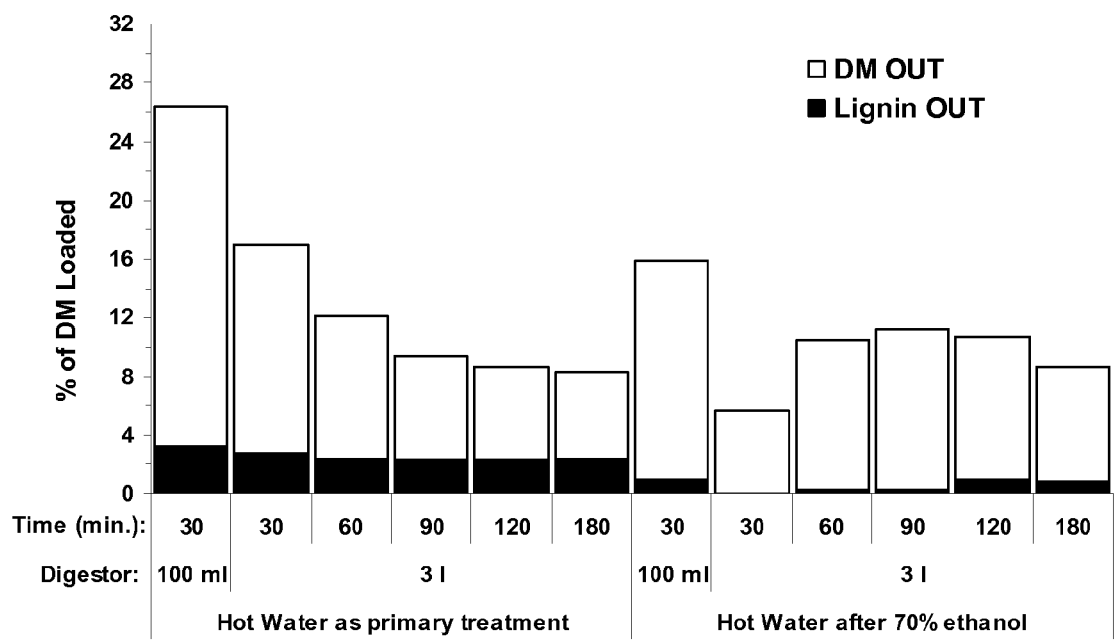
FIG. 13 shows the ratio of DM and lignin that was removed from *Salix* chips with hot waters applied as a primary treatment or, after a 70% ethanol treatment in the 100 ml and 3 l digestors, expressed as a percentage of the initial DM loaded.
Figure 14:
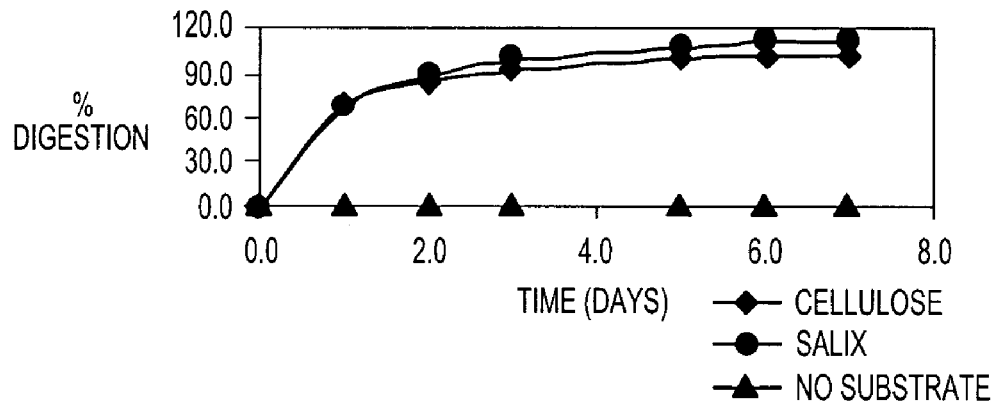
FIG. 14 is a graph showing the conversion of cellulose recovered following Organosolv™/liquid hot water treatment of *Salix* chips into glucose by enzymatic hydrolysis, compared with commercially obtained pure cellulose and cellulose recovery from untreated *Salix* chips.

FIG. 13 shows the ratio of DM and lignin removed by hot water treatment using the 100 ml and 3 l packed-bed digestors, expressed as a percentage of the DM loaded. When the hot water was applied as a primary treatment, up to 3% of the initial DM was rapidly recovered as lignin in the water solvent (within the first 30 min of treatment, corresponding to 10% of total lignin available). When the hot water was applied after the 70% ethanol treatment, no more than 1% of the initial DM was recovered as lignin in the water solvent (3% of the total available lignin in the untreated *Salix* chips).

The lignin precipitated from the ethanol hydrolysate by addition of acidic water had an average molecular weight of approximately 2,000 Daltons and was estimated to be small pentameric to decameric polymers with a guaiacyl:syringyl unit ration of 1:4 as shown by NMR spectroscopy analysis. NMR analysis also showed that the *Salix* lignin underwent little modification under the optimum pre-treatment conditions (70% ethanol at 195° C. for 60 minutes).

Table 3 shows the composition of treated *Salix* wood chips after pre-treatment with 70% ethanol at 175° C. to 195° C. (60 min in 100 ml digestor, 180 min in the 3 l packed-bed digestor and 345 min in the 40 l batch digestor) followed by water treatment at 170° C. to 190° C. (30 min in the 100 ml digestor, 180 min in the 3 l packed-bed digestor and 375 min in the 40 l batch digestor), compared with untreated *Salix* wood chips.

TABLE 3

| Scale & Component | Composition Un-Treated *Salix* chips (% DW chips) | Composition of solid and liquid stream after chips pretreatment (% of total DW In) | | | | Product Recovery (% of total component in untreated chips) | | | |
|---|---|---|---|---|---|---|---|---|---|
| | | Hydrolysate | | | | Hydrolysate | | | |
| | | Ethanol | Water | Pulp | Total | Ethanol | Water | Pulp | Total |
| 100 ml | DM | 26.5 ± 4.04 | 17.9 ± 5.00 | 58.3 ± 1.83 | 102.7 | | | | |
| Lignin | 29 ± 3 | 9.3 | 1.0 | 10.5 | 21 | 32 | 3 | 36 | 72 |
| Glucan | 31 ± 4 | nd | nd | 30.4 | 30 | nd | nd | 98 | 98 |
| Xylan | 10 ± 2 | nd | 2.1 | 4.6 | 7 | nd | 21 | 46 | 67 |
| Other | 30 | 17.2 | 14.8 | 12.8 | 45 | 57 | 49 | 43 | 149 |
| 3 l | DM | 25 | 15 | 60 | 100 | | | | |
| Lignin | 29 ± 3 | 8.1 | 0.5 | 12.2 | 21 | 28 | 2 | 42 | 72 |
| Glucan | 31 ± 4 | 0.1 | 1.25 | 38.0 | 39 | 0 | 4 | 123 | 127 |
| Xylan | 10 ± 2 | 0.4 | 2.4 | 0.04 | 3 | 4 | 24 | 0 | 28 |
| Other | 30 | 16.38 | 10.9 | 9.8 | 37 | 55 | 36 | 33 | 123 |
| 40 l | DM | 26 | 14 | 60 | 100 | | | | |
| Lignin | 29 ± 3 | 9.1 | nd | 17.0 | 26 | 31 | nd | 59 | 90 |
| Glucan | 31 ± 4 | nd | nd | 32.6 | 33 | nd | nd | 105 | 105 |
| Xylan | 10 ± 2 | 0.0 | nd | 0 | 0 | 0 | nd | 0 | 0 |
| Other | 30 | 17.0 | nd | 10.4 | 27 | 56 | nd | 35 | 91 |

Glucose Recovery and Fermentation to Ethanol

Figure 15:
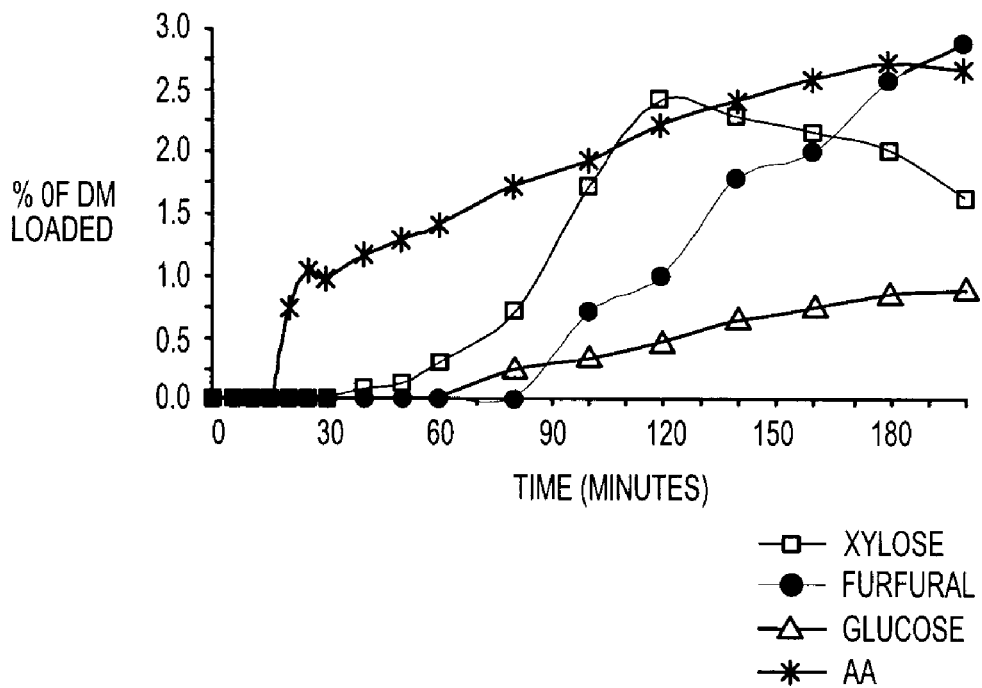
FIG. 15 is a graph showing the accumulation of xylose, furfural, acetic acid and glucose during the hot water treatment of 70% ethanol treated *Salix* chips in the 3 l digestor.

Pre-treatment of *Salix* chips yielded most of the cellulose in the pulp as shown by the recovery of more than 98% of the total input glucan in this fraction at each of the digestor scales tested (100 ml, 3 l or 40 l digestors, Table 3). As shown in FIG. 15 and Table 4, complete conversion of the recovered cellulose into glucose was achieved after a standard five hours treatment with cellulase (*Trichoderma reesei* (Celluclast, Novozyme, Denmark)) at 80 pfu per gram of glucan (theoretical) and 0.05% beta glucosidase (*Aspergillus niger* (Novozyme 188)) as recommended by the enzyme manufacturer. Also, this result indicated that the residual lignin and xylose in the pulp, at cellulose loading ratio of 1%, did not interfere with the enzyme activity (Tables 3 and 4). This provided a glucose substrate at a concentration of 10 to 12 g per liter for fermentation to ethanol.

TABLE 4

Efficiency of enzymatic digestion of pre-treated *Salix* chips at constant enzyme loading (80 pfu/g cellulose)

| Digestor | Pre-Treatment | Cellulose loading (% in enzyme reaction) | Agitation | Cellulose digestion (%) |
|---|---|---|---|---|
| 100 ml | 70% ethanol | 1 | Shaking | 100% |
| 3 l | and hot water | 1 | Shaking | 100% |
| 40 l | 70% ethanol | 5 | Shaking | 46.31% |
| | | 4 | Shaking | 51.91% |
| | 70% ethanol | 4 | Shaking | 65% |
| | and hot water | 5 | Shaking | 76% |
| | | 6 | Rolling | 91% |
| | | 8 | Shaking | 61% |
| | | 8 | Rolling | 70% |
| | | 11 | Shaking | 41% |

The effect of the hot water treatment on the hydrolysis of the 70% ethanol treated chips was observed when the enzymatic reaction was performed using higher concentration of cellulose (cellulose loading ratio >4). As shown in Table 4, over 20% more glucose was produced at equivalent cellulose loading of 4-5%, when the 70% ethanol pre-treated chips were also treated with hot water. This improvement of cellulose digestion at higher loading ratio probably reflected the lower content of lignin and xylose observed in the pulp provided after hot water treatment.

The digestibility of the cellulose yielded by the 70% ethanol and hot water treatment was further improved by providing agitation using rollers instead of using a flask shaker during the enzymatic reaction (Table 4).

Glucose was fermented to ethanol using 64 ml hydrolysate and 4.5 ml Still Spirits Temperature Tolerant Turbo Yeast (Brewcraft USA, Portland, Oreg.) in 6.4 ml 10×YP medium (YP medium: 100 g/l yeast extract and 200 g/l peptone). The reaction was allowed to proceed at 40° C. with agitation at 200 rpm until the growth curve of the yeast had reached a plateau, determined by measuring the $OD_{600}$ of hourly samples. The amount of ethanol and remaining glucose in the medium was determined by HPLC. The yield of ethanol from the digested *Salix* cellulose using *Saccharomyces cerevisiae* was 0.32 g of ethanol per g of glucose representing 62% of the theoretical yield of 0.51 g of ethanol per g of glucose.

Xylose Recovery

Because very small amounts of xylose and acetic acid were detected in the 70% ethanol solvent after the pre-treatment of the *Salix* chips (Table 3), we concluded that 70% ethanol treatments have little effect on the hemicellulose degradation.

The recovery of hemicellulose sugars varied according to the hot water pre-treatment conditions.

When a short hot water treatment (30 min) was performed on Salix chips pre-treated with 70% ethanol in the 100 ml digestor, residual xylose in the pulp fraction (4.6% of DM loaded=46% xylose available; Table 3) indicated an incomplete hemicellulose break down.

FIG. 15 shows the level of accumulation of xylose and furfural in the hot water applied after the 70% ethanol pre-treatment in the 3 l packed-bed digestor. The level of xylose peaked at 2.4% of the DM loaded (24% of the total xylose available) after 120 min, at which time the level of furfural production increased, indicating further degradation of the xylose yielded through efficient hydrolysis of hemicellulose sugar. As a result, the cellulose pulp that was produced after the 70% ethanol pre-treatment and longer hot water treatment contained greatly reduced levels of xylose (Table 3, <0.1% of DM loaded). Another indication of efficient hemicellulose hydrolysis during the hot water treatment was the formation of acetic acid as a consequence of the deacetylation of the acetylated moiety of hemicellulose (FIG. 15). FIG. 15 also shows that the amount of glucose was maintained at a low level during all times, indicating that the hot water treatment did not result in cellulose hydrolysis.

The importance on xylose recovery of applying the hot water treatment after the 70% ethanol pre-treatment was further demonstrated in the 40 l batch scale digestor. No xylose was detected in the cellulose pulp produced after the 70% ethanol and hot water treatment whereas xylose levels up to 7% of DM loaded (70% of total xylose) was measured in the cellulose pulp produced by the 70% ethanol treatment.

EXAMPLE 2

Biorefining of Wheat Straw

Table 5 shows the mass composition of untreated wheat straw and the composition of the hydrolysates and pulp produced during ethanol-water pre-treatment of the same wheat straw. The pre-treatment was applied as described above for the ethanol-water pre-treatment of the Salix chips in the 40 l batch digestor.

As seen in Table 5, only 27% of the initial dry matter was removed during sequential extraction with 70% ethanol and hot water. Therefore, less lignin was recovered in the ethanol solvent than when Salix chips were treated the same way. Also, a higher proportion of lignin was found in the wheat straw pulp. This may reflect the different type of lignin in wheat straw. As for the Salix pre-treatment, the pre-treatment of wheat straw with ethanol and water resulted in the recovery of all available glucose in the pulp.

When the pulp was submitted to enzymatic hydrolysis as described earlier for the Salix ethanol-water extracted pulp (cellulose loading ratio of 5 and cellulase loading of 80 fpu per gram), the cellulose in the wheat pulp was completely hydrolyzed (100%) within 6 days of reaction agitated using rollers.

EXAMPLE 3

Micropropagation of Salix spp

The technique of micropropagation was used to rapidly develop large numbers of clonal Salix spp. plantlets at low cost. Planting stakes of S. viminalis and S. schwerinii 'Kinuyanagi' were produced via micropropagation as follows.

To establish shoot cultures in vitro, stems from one-year-old Salix species grown in the field were collected in winter and cut into 25 to 35 cm long cuttings. The cuttings were washed in water, sterilized in 15% commercial bleach for 15 min and rinsed three times in water. The cuttings were then placed in a beaker containing water. Four to six weeks later, new shoots (5 to 10 cm long) were produced from the cuttings. The new shoots were collected and sterilized in 15% bleach after leaves were removed. The sterilized shoots were rinsed three times in sterile water in a sterile tissue culture hood. The shoots were then cut into 0.5 to 1 cm long micro-cuttings containing two nodes each. The micro-cuttings were placed into MS (Murashige and Skoog) medium (Sigma, St Louis Mo.; Murashige and Skoog, Physiol. Plant. 15:473-497, 1962) or M$^c$Cown Woody Plant medium (Duchefa, Haarlem, Netherlands; Lloyd and McCown, Proc. Int. Plant Prop. Soc. 30:421-427, 1981) supplemented with 0.1 to 1.0 mg/l BA (benzyladenine) and 0.1 to 1.0 g/l activated charcoal, and incubated in a plant growth room at 24° C. with a 16-hour photoperiod. Four weeks later, a shoot (2-4 cm long) and several roots were produced from each micro-cutting to form a plantlet. The plantlets were cut again into micro-cuttings and cultured in M$^c$Cown Woody Plant medium to increase the number of plantlets. This process may be repeated every four weeks. Plantlets were transplanted into potting mix in 25 ml cells.

Following transfer in soil, plantlets were kept in growth chamber containing 100% humidity for one week before being exposed to normal humidity conditions. Four weeks after transfer into potting mix, plantlets of 10-15 cm high were cut into 3-5 cm segments (containing a least 2 nodes) that were re-planted in potting mix in 25 ml cells to further increase the number of plantlets. Alternatively, the plantlets can be transplanted into the field seven weeks after initial transfer from culture media to potting mix, or after three weeks when the plantlet was produced from another plantlet in potting mix.

TABLE 5

| Scale & Component | Composition Un-Treated Wheat Straw (% DW chips) | Composition of solid and liquid stream after chip pretreatment (% of total DW In) | | | Product Recovery (% of total component in untreated chips) | | |
|---|---|---|---|---|---|---|---|
| | | Hydrolysate | | | Hydrolysate | | |
| | | Ethanol | Water | Pulp | Ethanol | Water | Pulp |
| 40 l | DM | 19 | 8 | 72 | | | |
| Lignin | 27 | 6 | 1 | 14 | 22 | 4 | 52 |
| Glucan | 37 | nd | <1 | 37 | nd | 0.3 | 100 |
| Xylan | 19 | nd | <1 | 3 | nd | 1 | 17 |

The composition of the M$^c$Cown Woody Plant medium used in these studies was as follows:

| Micro elements | |
|---|---|
| CuSO$_4$•5H$_2$O | 0.2 mg/l |
| FeNaEDTA | 36.70 mg/l |
| H$_3$BO$_3$ | 6.20 mg/l |
| MnSO$_4$•H$_2$O | 22.30 mg/l |
| Na$_2$MoO$_4$•2H$_2$O | 0.25 mg/l |
| ZnSO$_4$•7H$_2$O | 8.60 mg/l |
| Macro elements | |
| CaCl$_2$ | 72.50 mg/l |
| Ca(NO$_3$)$_2$ | 386.80 mg/l |
| KH$_2$PO$_4$ | 170.00 mg/l |
| K$_2$SO$_4$ | 990.00 mg/l |
| MgSO$_4$ | 180.54 mg/l |
| NH$_4$NO$_3$ | 400.00 mg/l |
| Vitamins | |
| Glycine | 2.00 mg/l |
| myo-Inositol | 100.00 mg/l |
| Nicotinic acid | 0.50 mg/l |
| Pyridoxine HCl | 0.50 mg/l |
| Thiamine HCl | 1.00 mg/l |

The composition of Murashige and Skoog medium used in these studies was as follows:

| | |
|---|---|
| Ammonium nitrate | 1,650 mg/l |
| Boric acid | 6.2 mg/l |
| Calcium chloride | 440 mg/l |
| Cobalt chloride | 0.025 mg/l |
| Magnesium sulfate | 370 mg/l |
| Cupric sulfate | 0.025 mg/l |
| Potassium phosphate | 170 mg/l |
| Ferrous sulfate | 27.8 mg/l |
| Potassium nitrate | 1,099 mg/l |
| Manganese sulfate | 22.3 mg/l |
| Potassium iodine | 0.83 mg/l |
| Sodium molybdate | 0.25 mg/l |
| Zinc sulfate | 8.6 mg/l |
| Na$_2$EDTA•2H$_2$O | 37.2 mg/l |
| i-Inositol | 100 mg/l |
| Niacin | 0.5 mg/l |
| Pyridoxine•HCl | 0.5 mg/l |
| Thiamine•HCl | 0.1 mg/l |
| IAA | 1 mg/l |
| Kinetin | 0.04 mg/l |
| Glycine | 2.0 mg/l |
| Edamine | 1.0 g/l |

EXAMPLE 4

*Salix* spp Field Trial

Site trials were performed to determine the *Salix* species and growth regimes suitable for sites within the Lake Taupo catchments in New Zealand. *Salix viminalis* (a male clone) and *Salix schwerinii* 'Kinuyanagi' (an infertile male clone) were selected as preferred species. These cultivars were initially selected on the basis that commercial nurseries considered them to be high yielding and resistant to insect pests such as sawfly. The trials were established using 20 to 33 cm dormant stem cuttings planted at a stocking of ten to twelve thousand stem per hectare. Parameters that were evaluated for the optimum biomass production included planting density, stake length, soil preparation methods, fertilization regime, insect and weed management, and harvesting method.

The trial consisted of 32 plots (16 per species), testing site preparation of ripping compared with no ripping and cutting length. Cutting lengths of 20, 25 and 33 cm were tested. Weed control using Gardoprim® (Orion Crop Protection Ltd, Auckland, New Zealand) was applied to all plots. No fertilizer was applied due to the need to benchmark soil and foliage analysis in the first year. The designated measurement plot of forty trees was assessed in May 2006. Height of the dominant shoot, number of leaders greater than 50 cm from each cutting and the number of live cuttings converted to a stocking (stems/ha) was recorded (Table 6).

As seen in Table 6, there were no significant differences in height and number of leader stems between *Salix viminalis* and *Salix schwerinii* 'Kinuyanagi' one year after planting. Both species were well established on this specific site (light pumice based Taupo soil) independent of the site preparation method. It should be noted that ripping would be required if cuttings were planted mechanically. There was an increase in productivity with 25 cm cutting as compared with the 20 cm cutting but further increases in cutting length (from 25 to 33) had no impact on the stocking rates and mean height of the dominant shoot.

TABLE 6

Site trial measurement after one year

| Variety | Mean Height (m) | Mean Number of Leaders | Stocking (stems/ha) |
|---|---|---|---|
| Species | | | |
| schwerinii | 1.21 | 2.62 | 8,995 |
| viminalis | 1.18 | 2.78 | 9,403 |
| Site preparation | | | |
| Ripped | 1.30 | 2.84 | 8,909 |
| Unripped | 1.11 | 2.81 | 10,006 |
| Cutting length | | | |
| 20 | 1.14 | 2.51 | 8,856 |
| 25 | 1.23 | 2.85 | 9,876 |
| 33 | 1.25 | 3.11 | 9,641 |

The basic wood density, moisture content of one year old *Salix schwerinii* 'Kinuyanagi' and *Salix viminalis* were calculated (Table 7). Samples were collected for biomass analysis from four plants per plots where medium survival was recorded (2 plots per species).

TABLE 7

Biomass Analysis

| Species | Wood density (kg/m$^3$) | Moisture (%) |
|---|---|---|
| S schwerinii | 390 | 56.0 |
| S. viminalis | 384 | 55.5 |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, method, method step or steps, for use in practicing the present invention. All such modifications are intended to be within the scope of the claims appended hereto.

All of the publications, patent applications and patents cited in this application are herein incorporated by reference in their entirety to the same extent as if each individual publication, patent application or patent was specifically and individually indicated to be incorporated by reference in its entirety.

We claim:

1. A method for extracting hemicellulose sugars from plant material, comprising:
    contacting lignin-depleted plant material solids with water at an elevated temperature and at an elevated pressure, in the absence of an introduced acid catalyst, under conditions that promote extraction of hemicellulose sugars, from the treated plant material solids to produce: i) an aqueous mixture comprising water-soluble hemicellulose sugars and ii) treated plant material solids comprising cellulose in a hydrolysable pulp;
    separating the aqueous mixture from the treated plant material solids; and
    recovering hemicellulose sugars from the aqueous mixture.

2. The method of claim 1 wherein the elevated temperature is between 160° C. and 220° C.

3. The method of claim 1 wherein the elevated pressure is between 12-25 Barg.

4. The method of claim 1, comprising recovering xylose from the aqueous mixture.

5. The method of claim 1, comprising recovering furfural from the aqueous mixture.

6. The method of claim 1, comprising recovering acetic acid from the aqueous mixture.

7. The method of claim 1, comprising recovering para-hydroxy-benzoic acid from the liquid mixture.

8. The method of claim 1, comprising recovering vanillin from the aqueous mixture.

9. The method of claim 1, wherein the plant material is a lignocellulosic material selected from the group consisting of: woody or herbaceous materials, agricultural or forestry residues, and dedicated energy crops.

10. The method of claim 1, wherein the plant material is selected from the group consisting of: Salix, Poplar, Eucalyptus, switch grass, miscanthus, sugar cane bagasse, soybean stover, corn stover, rice straw, barley straw, wheat straw, corn fiber, wood fiber, and combinations thereof.

11. The method of claim 1; further comprising hydrolyzing the cellulose present in the treated plant material solids to produce a glucose-rich product.

12. The method of claim 1, further comprising promoting hydrolysis of cellulose present in the treated plant material solids to glucose in a simultaneous saccharification and fermentation process.

13. The method of claim 11, further comprising fermenting the glucose-rich product to produce an ethanol-containing fermentation product and recovering ethanol from the ethanol-containing fermentation product.

* * * * *